US009407326B2

(12) United States Patent
Fornage et al.

(10) Patent No.: US 9,407,326 B2
(45) Date of Patent: *Aug. 2, 2016

(54) METHOD AND APPARATUS FOR THREE-PHASE POWER LINE COMMUNICATIONS

(71) Applicant: Enphase Energy, Inc., Petaluma, CA (US)

(72) Inventors: Martin Fornage, Petaluma, CA (US); Jianzhong Huang, San Jose, CA (US); Fenghua Liu, Portland, OR (US); Kennan Laudel, San Jose, CA (US); Stephen Pope, Berkeley, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,652

(22) Filed: May 11, 2015

(65) Prior Publication Data

US 2015/0280784 A1 Oct. 1, 2015

Related U.S. Application Data

(63) Continuation-in-part of application No. 13/768,648, filed on Feb. 15, 2013, now Pat. No. 9,030,302.

(60) Provisional application No. 61/599,717, filed on Feb. 16, 2012.

(51) Int. Cl.
*H04L 25/00* (2006.01)
*H04B 3/54* (2006.01)
*H04B 3/56* (2006.01)

(52) U.S. Cl.
CPC .................. *H04B 3/544* (2013.01); *H04B 3/54* (2013.01); *H04B 3/56* (2013.01); *H04B 2203/5466* (2013.01); *H04B 2203/5491* (2013.01)

(58) Field of Classification Search
CPC ..... H04B 3/54; H04B 3/56; H04B 2203/5466
USPC ............ 375/257, 288, 300; 340/12.32, 12.22, 340/310, 18; 263/74, 131
See application file for complete search history.

(56) References Cited

U.S. PATENT DOCUMENTS 634,368 A 10/1899 Pounds
4,668,934 A 5/1987 Shuey
(Continued)

FOREIGN PATENT DOCUMENTS

CN 1839558 A 9/2006
EP 2359455 A2 8/2011
(Continued)

OTHER PUBLICATIONS

International Search Report and Written Opinion mailed Jun. 10, 2013 for Application No. PCT/US2013/026579, 9 pages.
(Continued)

*Primary Examiner* — Khai Tran
(74) *Attorney, Agent, or Firm* — Moser Taboada

(57) ABSTRACT

Method and apparatus for generating a balanced three-phase power line communication signal. In one embodiment, the method comprises generating a plurality of modulation signals based on at least one data stream; modulating a plurality of carrier signals by the plurality of modulation signals to generate a balanced three-phase PLC signal comprising a first phase signal, a second phase signal, and a third phase signal; and coupling the balanced three-phase PLC signal to a three-phase power line.

19 Claims, 13 Drawing Sheets

(56) References Cited

U.S. PATENT DOCUMENTS

| | | |
|---|---|---|
| 4,903,006 A | 2/1990 | Boomgaard |
| 5,751,138 A | 5/1998 | Venkata et al. |
| 6,037,678 A | 3/2000 | Rickard |
| 6,753,792 B2 | 6/2004 | Beckwith |
| 7,012,505 B1 | 3/2006 | Arden |
| 7,170,395 B2 | 1/2007 | Crenshaw et al. |
| 7,268,670 B2 | 9/2007 | Robertson |
| 7,310,385 B2 | 12/2007 | Brown et al. |
| 7,319,280 B1 | 1/2008 | Landry et al. |
| 7,782,976 B1 * | 8/2010 | Falcone ............ H04L 25/03834 342/21 |
| 7,791,468 B2 | 9/2010 | Bonicatto et al. |
| 7,977,810 B2 | 7/2011 | Choi et al. |
| 8,653,689 B2 | 2/2014 | Rozenboim |
| 9,030,302 B2 * | 5/2015 | Fornage ................ H04B 3/54 340/12.32 |
| 2002/0109585 A1 | 8/2002 | Sanderson |
| 2003/0158677 A1 | 8/2003 | Swarztrauber et al. |
| 2003/0197426 A1 | 10/2003 | Carson et al. |
| 2005/0046550 A1 | 3/2005 | Crenshaw et al. |
| 2005/0226200 A1 | 10/2005 | Askildsen et al. |
| 2007/0138867 A1 | 6/2007 | Choi et al. |
| 2009/0135948 A1 * | 5/2009 | Kisovec ............ H04L 25/03834 375/295 |
| 2009/0295551 A1 | 12/2009 | Dickey |
| 2011/0267857 A1 | 11/2011 | Fornage |
| 2013/0141015 A1 * | 6/2013 | Van Der Brug .... H05B 37/0263 315/297 |

FOREIGN PATENT DOCUMENTS

| | | |
|---|---|---|
| KR | 1020070064881 A | 6/2007 |
| WO | WO-9806187 A1 | 2/1998 |
| WO | WO-2013061206 A2 | 5/2013 |

OTHER PUBLICATIONS

European Patent Office Action Substantive Search Report, Application No. 13748967.0-1855/ 2815517, PCT/US2013026579, 8 Pages, Sep. 22, 2015.

* cited by examiner

METHOD AND APPARATUS FOR THREE-PHASE POWER LINE COMMUNICATIONS

CROSS-REFERENCE TO RELATED APPLICATIONS

This application is a continuation-in-part of co-pending U.S. patent application Ser. No. 13/768,648, filed Feb. 15, 2013, which claims benefit of U.S. provisional patent application Ser. No. 61/599,717, filed Feb. 16, 2012. Each of the aforementioned patent applications is herein incorporated in its entirety by reference.

BACKGROUND OF THE INVENTION

1. Field of the Invention

Embodiments of the present disclosure relate generally to power line communication (PLC) and, in particular, to PLC via three phase power lines.

2. Description of the Related Art

Power Line Communications (PLC) is a technology for utilizing power lines, such as the existing commercial AC power grid infrastructure, to communicate data between devices coupled to the power lines. For PLC transmission, a transmitter is generally coupled to the power line through an isolation transformer and injects a modulated carrier signal as a voltage stimulus on the power line (i.e., a voltage-based signal). A receiver coupled to the power line receives the modulated carrier signal and decodes the signal to recover the originally transmitted data.

For PLC over three-phase power lines, the communication signal may be injected onto all three phases of the power lines; alternatively, all three power lines may be coupled to one another with sufficiently large capacitors and the communication signal may be injected onto one of the phases of the power lines. Such configurations present several disadvantages. For example, a neutral line, or in some cases ground line, is required for a return line. When utilizing the power line ground as the return line, large capacitors rated for very high surge voltages must be used to couple between line to ground, increasing the cost of the overall communication system. Further, since some industrial applications don't require a neutral line, one must be run for such installations if the neutral line is to be used for the return path, greatly increasing the wiring cost for the system. Additionally, such PLC configurations suffer from imbalance as a result of the signal being carried on all three phases of the power line on one side but only on a neutral line on the return, resulting in radiated emissions as well as sensitivity to external noise.

Therefore, there is a need in the art for a method and apparatus for efficient three-phase power line communication.

SUMMARY OF THE INVENTION

Embodiments of the present invention generally relate to a method and apparatus for generating a balanced three-phase power line communication signal. In one embodiment, the method comprises generating a plurality of modulation signals based on at least one data stream; modulating a plurality of carrier signals by the plurality of modulation signals to generate a balanced three-phase PLC signal comprising a first phase signal, a second phase signal, and a third phase signal; and coupling the balanced three-phase PLC signal to a three-phase power line.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
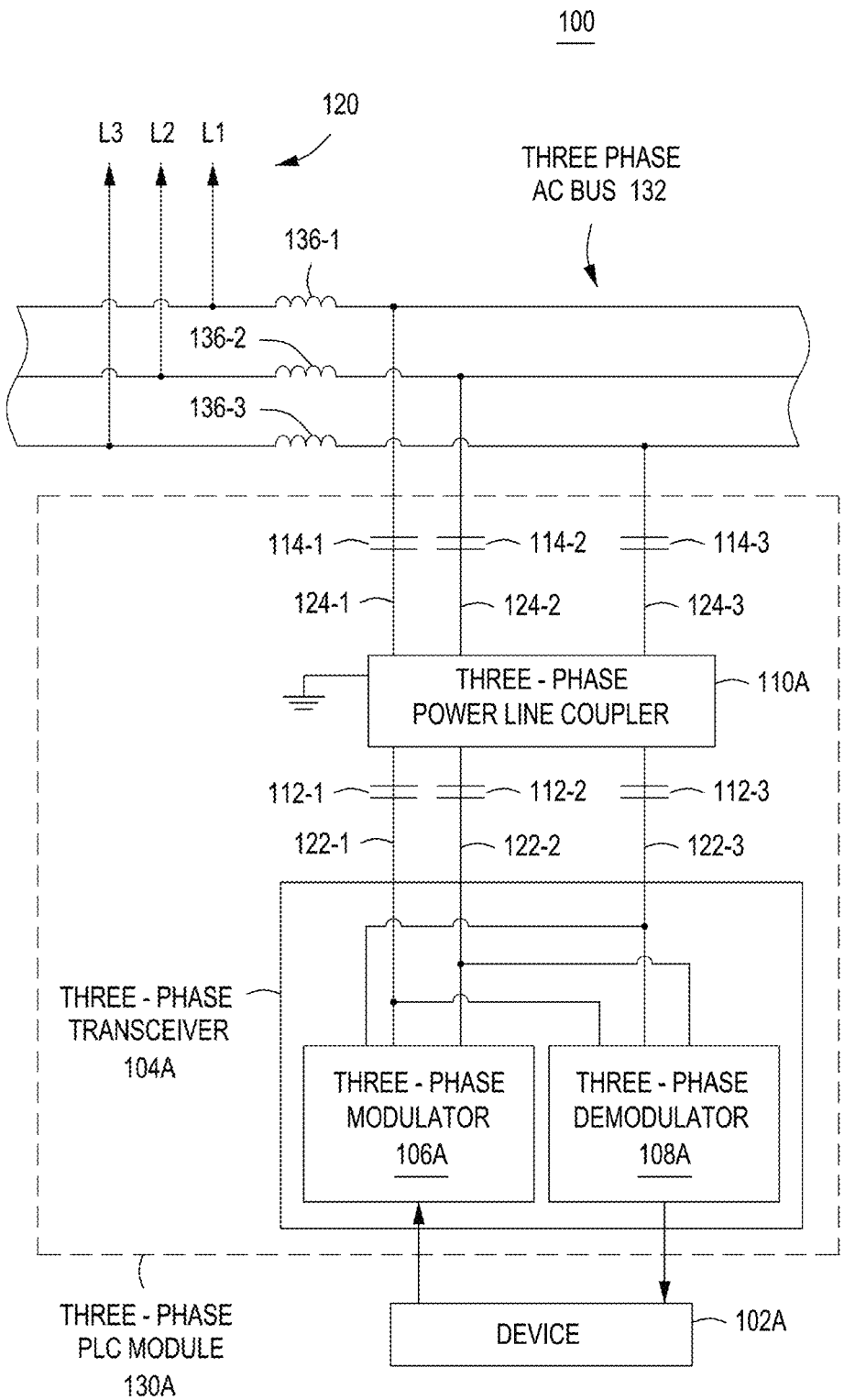
FIGS. 1a-1b are block diagrams of a system for balanced three-phase power line communication (PLC) in accordance with one or more embodiments of the present invention.
Figure 1B:
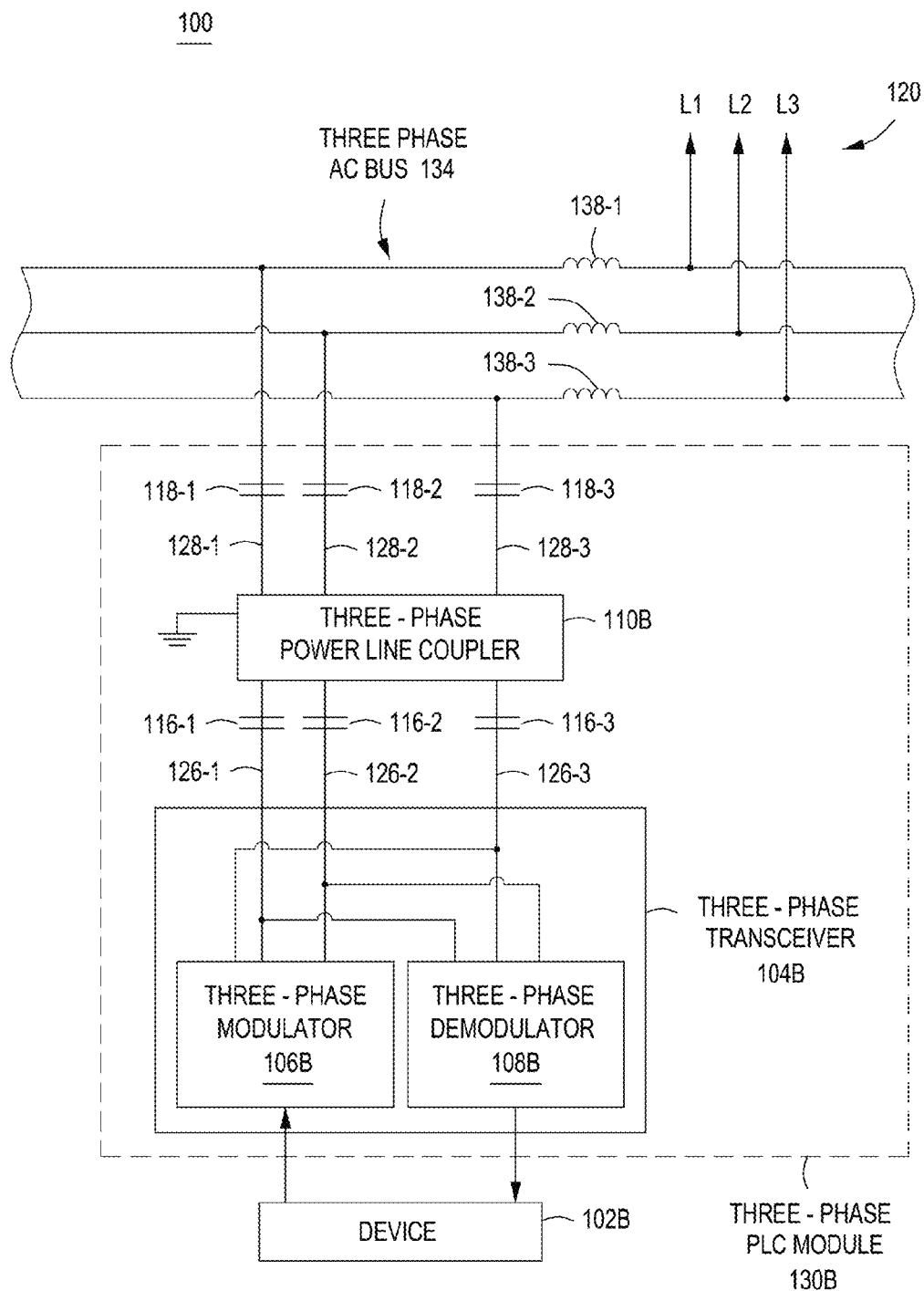

FIGS. 1a-1b are block diagrams of a system 100 for balanced three-phase power line communication (PLC) in accordance with one or more embodiments of the present invention. The system 100 comprises devices 102A and 102B coupled to a three-phase AC power line 120 via three-phase power line communication (PLC) modules 130A and 130B, respectively. Each three-phase PLC module 130 comprises a three-phase transceiver 104 and a three-phase power line coupler 110 (i.e., PLC module 130A comprises transceiver 104A and coupler 110A; PLC module 130B comprises transceiver 104B and coupler 110B), where the three-phase power line couplers 110 are coupled to ground. The devices 102A and 102B may be any suitable devices that require communications bandwidth for transmitting and/or receiving data, such as a home computer, peripheral device, and the like. In some embodiments, the devices 102A and/or 102B may be power conversion modules, such as DC/AC inverters, or AC/AC converters, coupled to distributed generators (DGs) for converting power generated by the DGs; alternatively, one of the devices 102A or 102B may be a controller that communicates with such power conversion modules.

The device 102A is coupled to the three-phase transceiver 104A, which is further coupled to the three-phase power line coupler 110A by coupling capacitors 112-1, 112-2, and 112-3 (collectively referred to as coupling capacitors 112) on transceiver output lines 122-1, 122-2, and 122-3 (collectively referred to as output lines 122), respectively. Three output lines 124-1, 124-2, and 124-3 (collectively referred to as output lines 124) from the three-phase power line coupler 110A are coupled to phase lines L1, L2, and L3 of the power line 120 by coupling capacitors 114-1, 114-2, and 114-3 (collectively referred to as coupling capacitors 114), respectively, and further by inductors 136-1, 136-2, and 136-3 (collectively referred to as inductors 136), for example as part of a three-phase AC bus 132. The coupling capacitors 112 and 114 may be on the order of 10 nanofarads (nF) to 100 microfarads (µF), depending on the frequency range and the circuit; in some embodiments, the coupling capacitors 114 may be excluded if the three-phase modulator output does not have a DC component. The inductors 136 may be on the order of 100 microhenries (pH) to 2 millihenries (mH). Phase lines L1, L2, and L3 are live conductors each carrying a different phase of AC power. In some embodiments, the power line 120 may also comprise a neutral line and/or ground line.

The device 102B is coupled to the three-phase transceiver 104B, which is further coupled to the three-phase power line coupler 110B by coupling capacitors 116-1, 116-2, and 116-3 (collectively referred to as coupling capacitors 116) on output lines 126-1, 126-2, and 126-3 (collectively referred to as output lines 126), respectively. Three output lines 128-1, 128-2, and 128-3 (collectively referred to as output lines 128) from the three-phase power line coupler 110B are coupled to phase lines L1, L2, and L3 of the power line 120 by coupling capacitors 118-1, 118-2, and 118-3 (collectively referred to as coupling capacitors 118), respectively, and further by inductors 138-1, 138-2, and 138-3 (collectively referred to as inductors 138), respectively, for example as part of a three-phase AC bus 134. The coupling capacitors 116 and 118 may be on the order of 10 nanofarads (nF) to 100 microfarads (µF), depending on the frequency range and the circuit; in some embodiments, the coupling capacitors 118 may be excluded if the three-phase modulator output does not have a DC component. The inductors 138 may be on the order of 100 microhenries (pH) to 2 millihenries (mH). In some embodiments, the three-phase AC bus 132 and/or the three-phase AC bus 134 may be coupled to the power line 120 via a junction box.

The three-phase transceivers 104A and 104B comprise three-phase modulators 106A and 106B, respectively, and three-phase demodulators 108A and 108B, respectively. The modulator 106A and demodulator 108A are each coupled to the device 102A as well as to the transceiver output lines 122; the modulator 106B and demodulator 108B are each coupled to the device 102B as well as to the transceiver output lines 126. In some embodiments, such as the embodiment described below, the device 102A transmits data to the device 102B over the power line 120. In other embodiments, the device 102B transmits data to the device 102A over the power line 120; in still other embodiments, the devices 102A and 102B simultaneously communicate data to one another via the power line 120.

In accordance with one or more embodiments of the present invention where the device 102A transmits data to the device 102B, the three-phase PLC module 130A injects a balanced three-phase PLC signal onto phase lines L1, L2 and L3 of the power line 120 to communicate the data to the device 102B; i.e., the vector sum of the communication signals coupled to the power line 120 is zero. In some embodiments, three carriers having the same frequency and phase-shifted from one another by 120° are each modulated by the same modulation signal and the resulting balanced signal is coupled to the power line 120. In other embodiments, two of the carriers are independently modulated by first and second modulation signals, and the third carrier is modulated by a third modulation signal such that the vector sum of the three modulated signals is equal to zero. In still other embodiments, the three carriers are modulated by three correlated modulation signals such that the vector sum of the three modulated signals is equal to zero. In some alternative embodiments, two independent vectors are received from the device 102A and are phase-shifted and added in various combinations to generate a balanced three-phase PLC signal.

The three PLC signals generated by the three-phase transceiver 104A are coupled to the three-phase power line coupler 110A. The three-phase power line coupler 110A comprises a transformer having three independent legs, such as a delta-delta transformer, a delta-wye transformer, a wye-delta transformer, or a wye-wye transformer. The three-phase power line coupler 110A couples the three PLC signals to the phase lines L1, L2, and L3, one phase per phase line. By coupling such a balanced three-phase signal to the phase lines L1, L2, and L3, emissions are eliminated as well as the need for a return signal path, and the balanced communication signal is resistant to external noise.

At the three-phase PLC module 130B, the three-phase power coupler 110B, analogous to the three phase power line coupler 110A, couples the three-phase PLC signal from phase lines L1, L2, and L3 to the three-phase demodulator 108B. The three-phase demodulator 108B demodulates the received signals and recovers the originally transmitted data for transmission to the device 102B. In one or more alternative embodiments, the three-phase demodulator 108B recovers two independent vectors by suitably dividing, phase-shifting, and adding various combinations of the three PLC signals; in such embodiments, the three-phase demodulator 108B may transmit the recovered vectors directly to the device 102B.

In some alternative embodiments, the power line coupler 110A and/or the power line coupler 110B comprises a Scott-T transformer for coupling two phases on the transceiver side to the three-phase power line 120. In such embodiments, the three-phase carrier system on the transceiver side (e.g., three carriers 120 degrees apart generated by the three-phase transceiver 104A) is reduced to a two-phase carrier system (e.g., two carriers 90 degrees generated by the transceiver 104A), thereby reducing the number of transmitters/receivers required in each transceiver 104A and 104B from three to two.

In one or more embodiments, the device 102B may transmit data to the device 102A; i.e., the three-phase PLC module 130B injects a balanced three-phase PLC signal onto phase lines L1, L2 and L3 of the power line 120 as previously described with respect to the three-phase PLC module 130A, and the three-phase demodulator 108A receives and recovers the originally transmitted data as previously described with respect to the three-phase demodulator 108B. In some such embodiments, the devices 102A and 102B may communicate with each other simultaneously via the power line 120.

Figure 2:
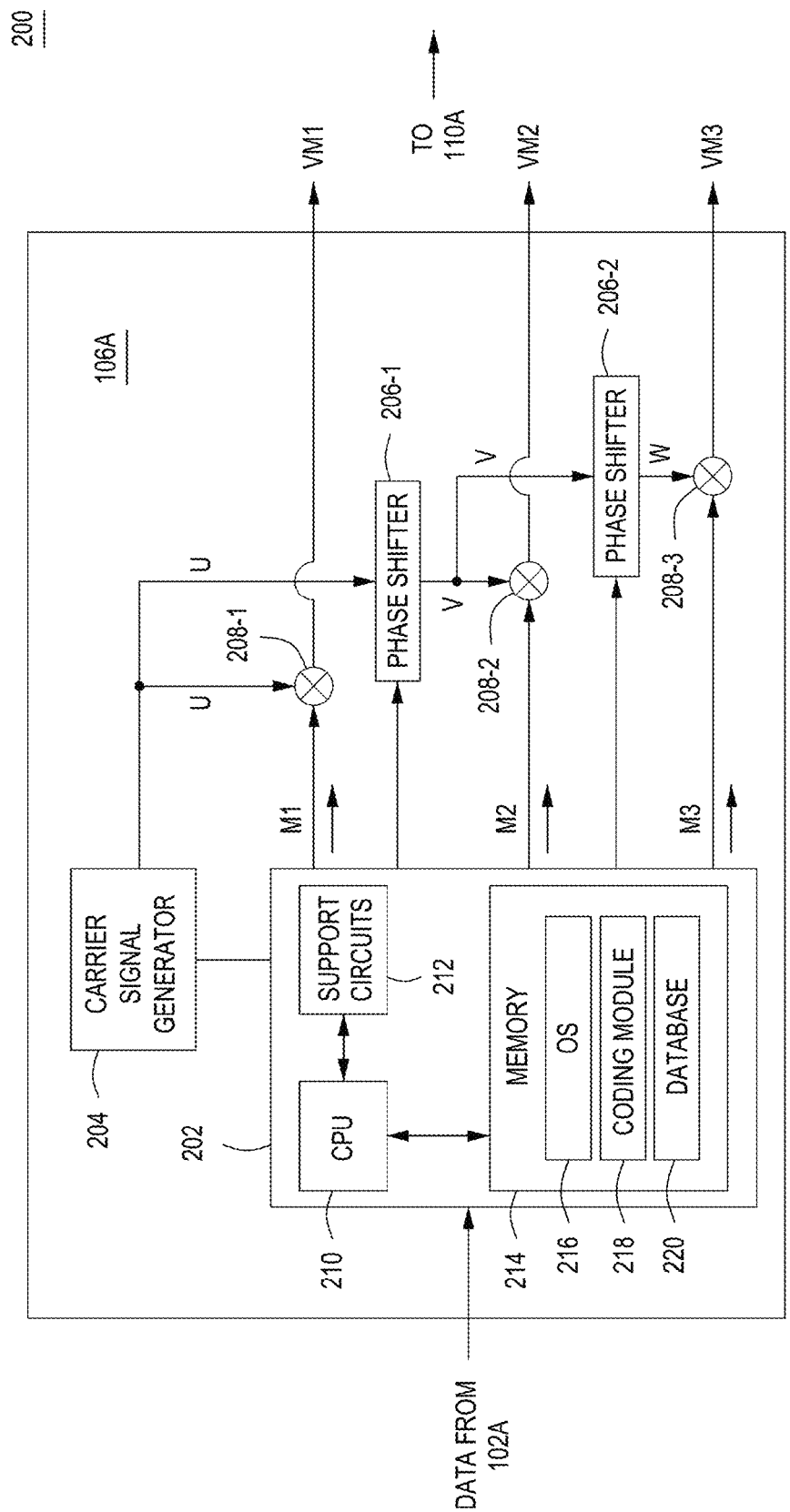
FIG. 2 is a block diagram of a three-phase modulator in accordance with one or more embodiments of the present invention.

FIG. 2 is a block diagram of a three-phase modulator 106A in accordance with one or more embodiments of the present invention. The three-phase modulator 106B may be analogous to the three-phase modulator 106A in terms of both components and operation.

The three-phase modulator 106A comprises a coder 202 (e.g., for pre-coding a signal), a carrier signal generator 204, phase shifters 206-1 and 206-2, and mixers 208-1, 208-2, and 208-3. The carrier signal generator 204 generates a sinusoidal first carrier signal U at a frequency, for example, of 100 KHz, although in other embodiments U may be generated at a different frequency. The first carrier signal U is coupled to the mixer 208-1 as well as to the phase shifter 206-1. The phase shifter 206-1 shifts the phase of the first carrier signal U to generate a second sinusoidal carrier signal V, which is coupled to the mixer 208-2 as well as to the phase shifter 206-2. The phase shifter 206-2 shifts the phase of the second carrier signal V to generate a third sinusoidal carrier signal W, which is coupled to the mixer 208-3. Generally the carrier signals U, V and W are sinusoidal waveforms, although in other embodiments other types of period waveforms may be used. In some embodiments, the carriers U, V, and W may be 120° phase shifted from one another; in other embodiments, the carriers U, V, and W may have a different phase relationship to one another. In one or more alternative embodiments, the carrier signals U, V, and W may be generated by a different means that produces three appropriate carrier signals; for example, the carrier signal generator 204 and the phase shifters 206 may be separate components from the modulator 106A and the modulator 106A receives the externally generated carrier signals U, V, and W. In exemplary embodiments, the phase shifters 206-1 and 206-2 use a Hilbert transform for shifting phase.

The coder 202 may be comprised of hardware, software, or a combination thereof, and comprises at least one central processing unit (CPU) 210 coupled to support circuits 212 and memory 214. The CPU 210 may comprise one or more conventionally available microprocessors, processors, microcontrollers and/or combinations thereof configured to execute non-transient software instructions to perform various tasks in accordance with the present invention. Alternatively, the CPU 210 may include one or more application specific integrated circuits (ASICs). The support circuits 212 are well known circuits used to promote functionality of the CPU 210. Such circuits include, but are not limited to, a cache, power supplies, clock circuits, buses, network cards, input/output (I/O) circuits, and the like. The coder 202 may be implemented using a general purpose computer that, when executing particular software, becomes a specific purpose computer for performing various embodiments of the present invention. In certain embodiments, hard-coded logic may be used to perform the functions of the coder 202, although generally a mix of both CPU and logic will be utilized.

The memory 214 may comprise random access memory, read only memory, removable disk memory, flash memory, and various combinations of these types of memory. The memory 214 is sometimes referred to as main memory and may, in part, be used as cache memory or buffer memory. The memory 214 generally stores the operating system (OS) 216 of the coder 202. The OS 216 may be one of a number of commercially available OSs such as, but not limited to, Linux, Real-Time Operating System (RTOS), and the like. The memory 214 stores non-transient processor-executable instructions and/or data that may be executed by and/or used by the CPU 210. These processor-executable instructions may comprise firmware, software, and the like, or some combination thereof. The memory 214 may store various forms of application software, such as a coding module 218, and a database 220 for storing data, such as data related to the present invention. The coder 202 executes the coding module 218 for coding received data as described below. In one or more other embodiments, the CPU 210 may be a microcontroller comprising internal memory for storing controller firmware that, when executed, provides the coder 202 functionality described herein.

The coder 202 is coupled to the device 102A and receives data from the device 102A for communication via the power line 120. In some embodiments the data may be analog data; in other embodiments the data may be digital data. The data may be communicated from the device 102A to the coder 202 by wired communication, wireless communication, or a combination thereof. The coding module 218 suitably codes the received data to generate three modulation signals M1, M2, and M3, which are coupled to mixers 208-1, 208-2, and 208-3, respectively, for modulating the corresponding carrier signals U, V, and W. In some embodiments, for example in certain embodiments employing modulation such as frequency-shift keying (FSK), phase shift keying (PSK), or quadrature amplitude modulation (QAM), the mixers 208 are complex mixers driven by I&Q carrier signals (U,V,W) and complex I&Q modulation signals (M1, M2, M3). In other embodiments, the mixers 208 may be "real" multipliers; for example, FSK or PSK modulation may be employed where the carrier signal generator 204 itself is modulated by a frequency or phase control, and the M1, M2, and M3 signals are identical ON/OFF commands to control the presence of the PLC signal.

In some embodiments, the coder 202 may be coupled to the carrier signal generator 204 and to phase shifters 206-1 and 206-2 for controlling the phases of the carrier signals U, V and W, for example, as determined by the coding module 218 based on the modulation technique employed. The generated modulation signals M1, M2, and M3 modulate the corresponding carriers U, V, and W, respectively, to generate the three modulated voltage signals VM1, VM2, and VM3 (i.e., a first phase signal, a second phase signal, and a third phase signal), respectively. The modulated voltage signals VM1, VM2, and VM3, which have a vector sum of zero, are respectively coupled to the phase lines L1, L2, and L3 by the three-phase power line coupler 110A for transmission.

In some embodiments, the coder 202 receives a single data stream from the device 102A and generates three identical modulation signals M1, M2, and M3. In such embodiments, the carriers U, V, and W may be orthogonal carriers having the same amplitudes, thus providing double redundancy of the data stream and allowing the demodulator 108 to select the best received signal for demodulation/output transmission.

In other embodiments, the coder 202 may receive two independent (i.e., different) data streams (e.g., on two separate input channels from the device 102A or on a single channel from the device 102A as a multiplexed stream) and generate two independent modulation signals, e.g., M1 and M2. In such embodiments, the coder 202 generates the third modulation signal, e.g., M3, and controls the phase shifters 206-1 and 206-2 such that the vector sum of the modulated voltage signals VM1, VM2, and VM3 will be equal to zero. The third modulated voltage signal VM3 thus provides a redundancy channel for determining either the modulation signal M1 or M2 if one or the other is lost or degraded during transmission.

In still other embodiments, the coder 202 may receive three independent data streams (e.g., on three separate input channels from the device 102A, on two separate input channels from the device 102A where one or both of the channels carries a multiplexed data stream, or on a single channel from the device 102A as a multiplexed stream) and, based on the data, generate correlated modulation signals M1, M2, and M3 such that the vector sum of the modulated voltage signals VM1, VM2, and VM3 will be equal to zero.

Any type of modulation technique may be used to generate the modulated voltage signals VM1, VM2, and VM3, such as frequency-shift keying (FSK), phase shift keying (PSK), quadrature phase shift keying (QPSK), quadrature amplitude modulation (QAM), phase modulation (PM), frequency modulation (FM), amplitude modulation (AM), orthogonal frequency-division multiplexing (OFDM), and the like. For example, QAM may be employed by generating U and V as quadrature carriers and amplitude modulating the carriers based on data received from device 102A, where the third carrier W is generated and modulated such that the vector sum of VM1, VM2, and VM3 is equal to zero.

In some alternative embodiments, the voltage signals VM1, VM2, and VM3 may be generated from two independent modulation signals, e.g., M1 and M2, or directly from two independent vectors received from the device 102A, as described below with respect to FIG. 7.

In one or more alternative embodiments, three current signals may be generated by the three-phase PLC module 130A and coupled to the phase lines L1, L2, and L3 rather than voltage signals, where the current signals are balanced such that the vector sum of the three current signals is equal to zero. In such embodiments the three-phase power line couplers 110A and 110B are coupled in series with the three-phase power line 120, and the turns ratio of the transformers within the line couplers 110A/110B is generally very low towards the power line 120, e.g., a 1-turn line connection, and many turns towards the transceiver-side. Further, in such embodiments the transmitters present a low impedance when off rather than a high impedance.

Figure 3:
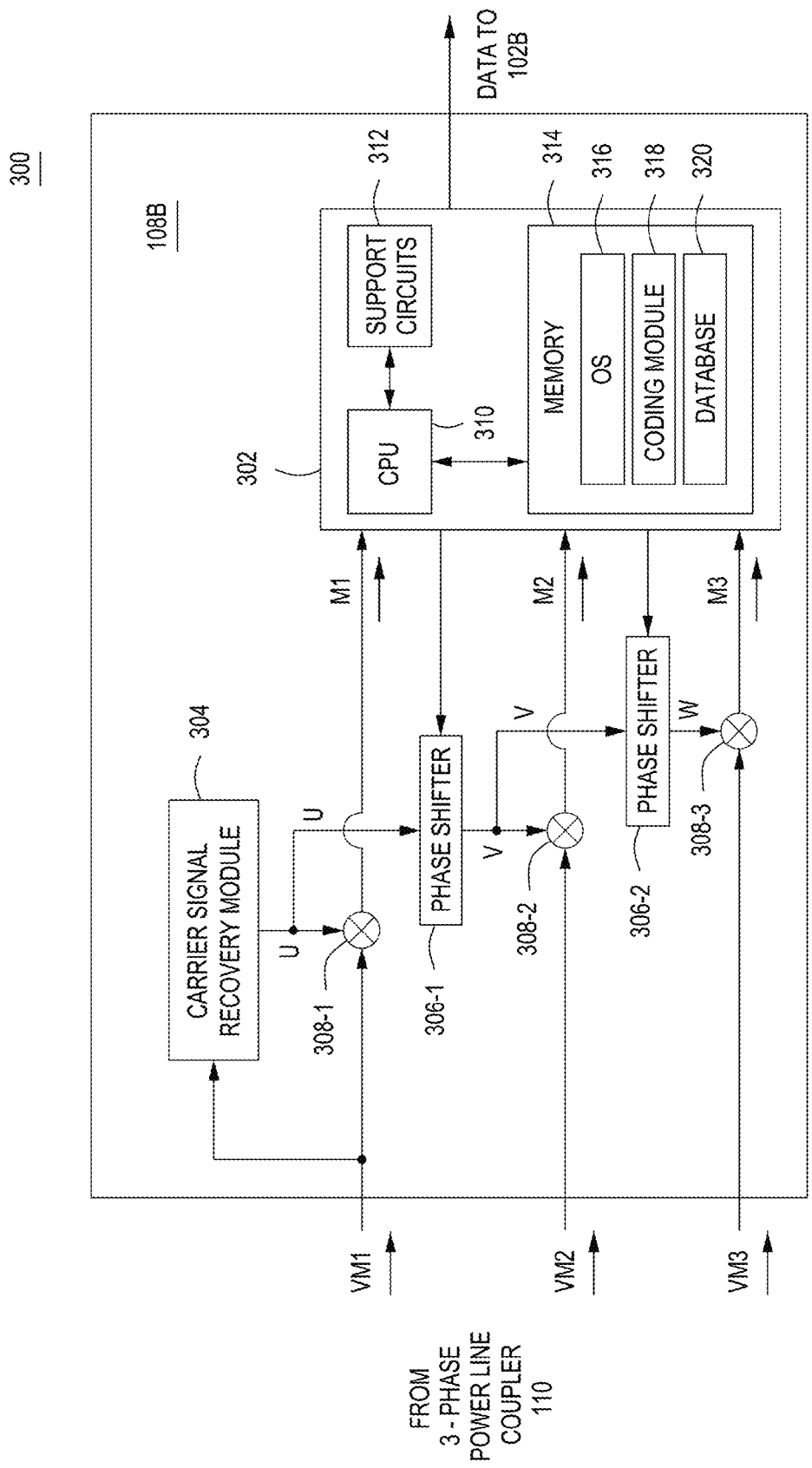
FIG. 3 is a block diagram of a three-phase demodulator in accordance with one or more embodiments of the present invention.

FIG. 3 is a block diagram of a three-phase demodulator 108B in accordance with one or more embodiments of the present invention. The three-phase demodulator 108A may be analogous to the three-phase demodulator 108B in terms of both components and operation.

The three-phase demodulator 108B comprises a decoder 302, a carrier signal recovery module 304, phase shifters 306-1 and 306-2, and mixers 308-1, 308-2, and 308-3. The three-phase power line coupler 110B couples the modulated voltage signals VM1, VM2, and VM3 from the power lines L1, L2, and L3 to the three-phase demodulator 108B. The carrier signal recovery module 304 recovers the first carrier signal U from the received signal VM1. The first carrier signal U is coupled to the mixer 308-1 as well as to the phase shifter 306-1. The phase shifter 306-1 shifts the phase of the first carrier signal U to generate the second carrier signal V, which is coupled to the mixer 308-2 as well as to the phase shifter 306-2. The phase shifter 306-2 shifts the phase of the second carrier signal V to generate the third carrier signal W, which is coupled to the mixer 308-3. In one or more alternative embodiments, the carrier signals U, V, and W may be recovered by a different means that produces the three recovered carrier signals; for example, the carrier recovery module 304 and the phase shifters 306-1 and 306-2 may be separate components from the demodulator 108B and the demodulator 108B receives the externally recovered carrier signals U, V, and W.

The decoder 302 may be comprised of hardware, software, or a combination thereof, and comprises at least one central processing unit (CPU) 310 coupled to support circuits 312 and memory 314. The CPU 310 may comprise one or more conventionally available microprocessors, processors, microcontrollers and/or combinations thereof configured to execute non-transient software instructions to perform various tasks in accordance with the present invention. Alternatively, the CPU 310 may include one or more application specific integrated circuits (ASICs). The support circuits 312 are well known circuits used to promote functionality of the CPU 310. Such circuits include, but are not limited to, a cache, power supplies, clock circuits, buses, network cards, input/output (I/O) circuits, and the like. The decoder 302 may be implemented using a general purpose computer that, when executing particular software, becomes a specific purpose computer for performing various embodiments of the present invention.

The memory 314 may comprise random access memory, read only memory, removable disk memory, flash memory, and various combinations of these types of memory. The memory 314 is sometimes referred to as main memory and may, in part, be used as cache memory or buffer memory. The memory 314 generally stores the operating system (OS) 316 of the decoder 302. The OS 316 may be one of a number of commercially available OSs such as, but not limited to, Linux, Real-Time Operating System (RTOS), and the like. The memory 314 stores non-transient processor-executable instructions and/or data that may be executed by and/or used by the CPU 310. These processor-executable instructions may comprise firmware, software, and the like, or some combination thereof. The memory 314 may store various forms of application software, such as a decoding module 318 and a database 320 for storing data, such as data related to the present invention. The decoder 302 executes the decoding module 318 for decoding received data as described below. In one or more other embodiments, the CPU 310 may be a microcontroller comprising internal memory for storing controller firmware that, when executed, provides the decoder 302 functionality described herein. In certain embodiments, hard-coded logic may be used to perform the functions of the decoder 302, although generally a mix of both CPU and logic will be utilized.

The decoder 302 receives the recovered modulation signals M1, M2, and M3 from the mixers 308-1, 308-2, and 308-3, respectively. In some embodiments, for example in certain embodiments employing modulation such as FSK, PSK, or QAM, the mixers 308 are complex mixers driven by I&Q carrier signals (U,V,W) and recovering complex I&Q modulation signals (M1, M2, M3); in other embodiments, the mixers 308 may be "real" multipliers. Decoding module 318 suitably decodes the received modulation signals M1, M2, and M3 to recover the originally transmitted data, and couples such data to the device 102B. In some embodiments, the decoder 302 may be coupled to the phase shifters 306-1 and 306-2 for controlling the phases of the recovered carrier signals V and W, for example, as determined by the decoding module 318 based on the modulation technique employed. The recovered data may be analog or digital data and may be communicated from the decoder 302 to the device 102B by wired communication, wireless communication, or a combination thereof.

In some embodiments, the modulation signals M1, M2, and M3 are identical signals and the decoding module 302 may select the best signal received to demodulate. Alternatively, the decoding module 302 may demodulate two or all three of the recovered modulation signals M1, M2, and M3 and select the best recovered data to transmit to the device 102B, or transmit all of the recovered data to the device 102B (e.g., as a single multiplexed data stream or on a plurality of separate data channels) for selecting the best recovered data.

In other embodiments, two of the modulation signals may be independent of one another and the third modulation signal is correlated to the first two modulation signals. The decoding module 318 may utilize the correlated modulation signal to recover data lost from either of the other two modulation carriers. The decoder 302 transmits the recovered data to the device 102B, for example on a single channel as a multiplexed data stream or on two separate data channels.

In still other embodiments, the recovered modulation signals may be correlated such that the decoding module 318 may recover three independent data streams. The decoder 302 may transmit the recovered data to the device 102B on a single channel as a multiplexed data stream, on two separate channels (e.g., where one of the channels comprises a two multiplexed data streams), or as three separate data channels.

In some alternative embodiments, only two independent modulation signals, e.g., M1 and M2, are recovered, or two independent vectors are recovered and transmitted to the device 102B, as described below with respect to FIG. 8.

Figure 4:
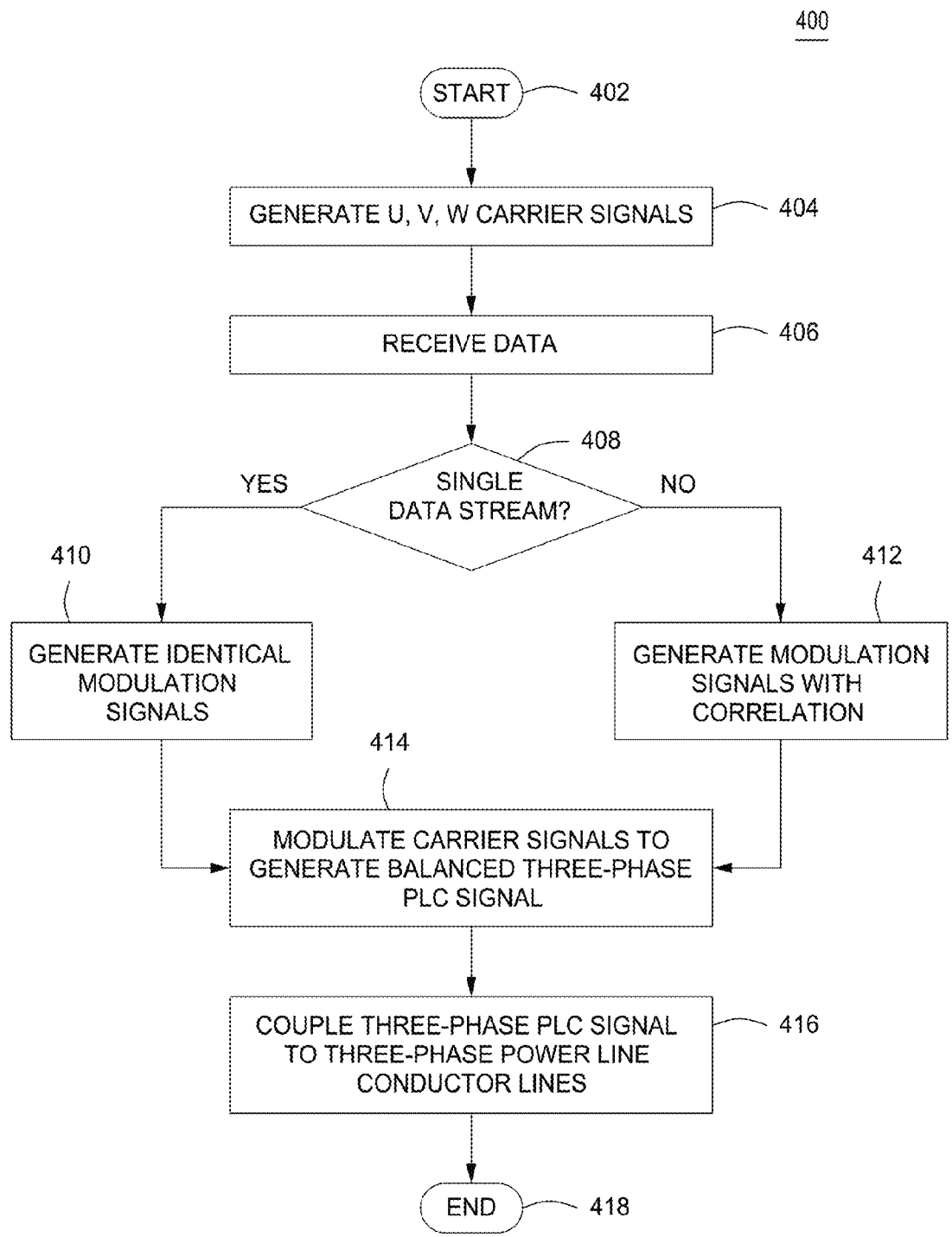
FIG. 4 is a flow diagram of a method for transmitting a balanced three-phase power line communication (PLC) signal over a three-phase power line in accordance with one or more embodiments of the present invention.

FIG. 4 is a flow diagram of a method 400 for transmitting a balanced three-phase power line communication (PLC) signal over a three-phase power line in accordance with one or more embodiments of the present invention. The method 400 starts at step 402 and proceeds to step 404. At step 404, three sinusoidal carrier signals U, V, and W are generated at a frequency of 100 KHz; alternatively, a different carrier frequency and/or a different periodic waveform may be used. In some embodiments, the carriers U, V, and W may be 120° phase shifted from one another; in other embodiments, the carriers U, V, and W may have a different phase relationship to one another. In some alternative embodiments, one or more of the carrier signals may be provided from an external source rather than being generated as part of the method 400.

The method 400 proceeds to step 406 where data is received for transmission via the three-phase power line. The data may be received from any suitable device that requires communications bandwidth for transmitting data, such as a home computer, peripheral device, and the like; in some embodiments, the device may be a power conversion module, such as a DC/AC inverter, or an AC/AC converter, or a controller that communicates with such a power conversion module. The data may be analog data or digital data and may be received via a wired connection, a wireless connection, or a combination thereof. The data may be received on a single channel, for example a single data stream or two or more multiplexed data streams. Alternatively, multiple data streams may be received on different channels.

At step 408 a determination is made whether the received data is a single data stream. If the result of the determination at step 408 is yes, that the received data is a single data stream, the method 400 proceeds to step 410. At step 410, three identical modulation signals M1, M2, and M3 are generated based on the received data and the method 400 proceeds to step 414. If the result of the determination at step 408 is no, that the received data is not a single data stream, the method 400 proceeds to step 412.

At step 412, three modulation signals are generated based on the received data streams. In some embodiments, two independent data streams may be received (for example, multiplexed onto a single channel or via two separate channels) and two independent modulation signals e.g., M1 and M2, are generated based on the received data. A third modulation signal, e.g., M3, is generated, correlated with the first two modulation signals such that the vector sum of the three modulated signals to be coupled to the power line is equal to zero. The third modulation signal thus provides a redundancy channel for determining either of the remaining modulation signals if one or the other of such signals is lost or degraded during transmission.

In other embodiments, three independent data streams may be received (for example, multiplexed onto one or two channels, or via three separate channels) and, based on the data, three correlated modulation signals M1, M2, and M3 are generated such that the vector sum of the three modulated signals to be coupled to the power line is equal to zero. In some alternative embodiments, only two independent modulation signals, e.g., M1 and M2, are utilized to generate three balanced voltage waveforms VM1, VM2, and VM3, as described below with respect to FIG. 7. In some embodiments, for example in certain embodiments employing modulation such as FSK, PSK, or QAM, the carrier signals (U, V, W) and the modulation signals (M1, M2, M3) are complex signals. The method 400 proceeds to step 414.

At step 414, the carrier signals U, V, and W are each modulated by one of the modulation signals to generate three modulated voltage waveforms VM1, VM2, and VM3 where the vector sum of the modulated voltage waveforms is equal to zero—i.e., a balanced three-phase PLC signal. For example, identical modulation signals M1, M2, and M3 may modulate orthogonal carriers U, V, and W, respectively, where the orthogonal carriers are each of the same amplitude. Any type of modulation technique, such as frequency-shift keying (PSK), phase shift keying (PSK), quadrature phase shift keying (QPSK), quadrature amplitude modulation (QAM), phase modulation (PM), frequency modulation (FM), amplitude modulation (AM), or the like, may be used to suitably generate the carrier signals U, V, and W (i.e., at step 404) and the modulation signals M1, M2, and M3 (i.e., a steps 410 and 412) such that the vector sum of the modulated voltage waveforms is equal to zero. For example, QAM may be employed by generating U and V as quadrature carriers and amplitude modulating the carriers based on two received data streams, where the third carrier W is generated and modulated such that the vector sum of VM1, VM2, and VM3 is equal to zero.

In one or more alternative embodiments, three modulated current signals may be generated rather than modulated voltage signals; in such embodiments, the modulated current signals are balanced such that the vector sum of the three modulated current signals is equal to zero.

In some alternative embodiments, two independent vectors are received and used to generate the balanced signals VM1, VM2, and VM3 by phase-shifting and adding the vectors as described below with respect to FIG. 7.

The method 400 proceeds to step 416, where the generated three-phase PLC signal (i.e., the modulated voltage waveforms VM1, VM2, and VM3) is coupled to the phase lines of the three-phase power line. Generally a three-phase power line coupler, such as three-phase power line coupler 110, couples the modulated voltage waveforms VM1, VM2, and VM3 to the phase lines, one modulated voltage waveform per phase line. For example, VM1 may be coupled to phase line L1, VM2 may be coupled to phase line L2, and VM3 may be coupled to phase line L3. In some alternative embodiments, the power line coupler comprises a Scott-T transformer for coupling two phases from the transceiver to the three-phase power line. Since the generated three-phase PLC signal coupled to the three-phase power line is balanced, no return path is needed and hence no connection to either a power line ground or neutral is needed. The method 400 then proceeds to step 418 where it ends.

Figure 5:
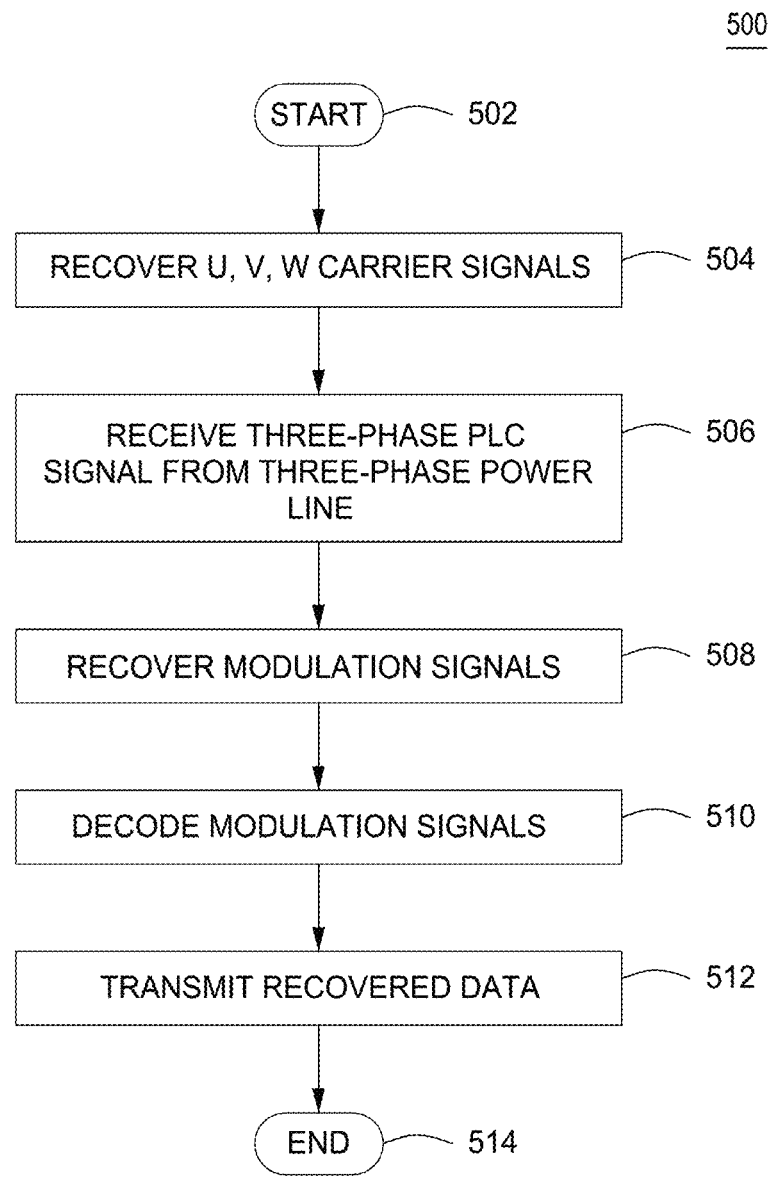
FIG. 5 is a flow diagram of a method for receiving and demodulating a balanced three-phase power line communication (PLC) signal transmitted over a three-phase power line in accordance with one or more embodiments of the present invention.

FIG. 5 is a flow diagram of a method 500 for receiving and demodulating a balanced three-phase power line communication (PLC) signal transmitted over a three-phase power line in accordance with one or more embodiments of the present invention. The method 500 starts at step 502 and proceeds to step 504. At step 504, three sinusoidal carrier signals U, V, and W are recovered from one or more of phase lines of the three-phase power lines. The recovered carriers may be at a frequency of 100 KHz, although other frequencies may be used. In some embodiments, the carriers U, V, and W may be 120° phase shifted from one another; in other embodiments, the carriers U, V, and W may have a different phase relationship to one another. In some alternative embodiments, one or more of the carrier signals may be provided from an external source rather than being recovered as part of the method 500.

The method 500 proceeds to step 506 where the three-phase PLC signal is received on the three-phase power line. The three-phase PLC signal consists of three modulated voltage signals VM1, VM2, and VM3, each modulated voltage signal carried on a different phase line of the three-phase power line. The modulated voltage signals VM1, VM2, and VM3 may be coupled from the power line to a demodulator by a three-phase power line coupler, such as three-phase power line coupler 110. In some alternative embodiments, the power line coupler comprises a Scott-T transformer for coupling three phases from the three-phase power line to the transceiver. In one or more alternative embodiments, the three-phase PLC signal consists of three modulated current signals rather than modulated voltage signals; in such embodiments, the modulated current signals are balanced such that the vector sum of the three modulated current signals is equal to zero.

At step 508, the modulation signals used to generate the modulated voltage signals VM1, VM2, and VM3 are recovered. For example, the recovered carrier U may be mixed with the modulated voltage signal VM1 to generate a first recovered modulation signal M1; recovered carrier V may be mixed with the modulated voltage signal VM2 to generate a second recovered modulation signal M2; and recovered carrier W may be mixed with the modulated voltage signal VM3 to generate a third recovered modulation signal M3. In some alternative embodiments, only two independent modulation signals, e.g., M1 and M2, are recovered, as described below with respect to FIG. 8. In some embodiments, for example in certain embodiments employing modulation such as FSK, PSK, or QAM, the recovered carrier signals (U, V, W) and the recovered modulation signals (M1, M2, M3) are complex signals.

The method 500 proceeds to step 510 where one or more of the recovered modulation signals are decoded in accordance with the coding technique used to generate the original modulation signals (e.g., the modulation signals generated at the three-phase modulator 106). In some embodiments, the original modulation signals are generated identically, and only one of the recovered modulation signals is decoded, for example as determined by the best received recovered modulation signal. Alternatively, in such embodiments, all of the recovered modulation signals may be decoded and a best recovered data stream may then be selected; for example, the demodulator may select the best recovered data stream and transmit that data to a downstream device, or the demodulator may transmit the recovered data from each recovered modulation signal to a downstream device which selects the best data stream.

In other embodiments, two recovered modulation signals may be independent of one another and the third recovered modulation signal is correlated with the first two recovered modulation signals. In such embodiments, the two independent recovered modulation signals may be decoded to recover two independent data streams. Alternatively, in such embodiments, one of the two independent modulation signals may be decoded to recover a first data stream and the correlated modulation signal is utilized to recover a second data stream. For example, M1 and M2 may be independent recovered modulation signals where M3 is the correlated recovered modulation signal. If, for example, M1 is lost or degraded during transmission, M2 may be decoded and M3 may be used along with M2 to recover M1 and the corresponding data.

In still other embodiments, the recovered modulation signals M1, M2, and M3 are correlated to one another and are decoded to recover three independent data streams. In some alternative embodiments, two independent vectors are recovered by suitably dividing, phase-shifting, and adding the balanced signals VM1, VM2, and VM3, as described below with respect to FIG. 7.

The method 500 proceeds to step 512 where the recovered data is transmitted to a suitable device that requires communications bandwidth for receiving data, such as a home computer, peripheral device, and the like; in some embodiments, the device may be a power conversion module, such as a DC/AC inverter, or an AC/AC converter, or a controller that communicates with such a power conversion module. The recovered data may be analog or digital data and may be transmitted to the device, for example via a wired connection, a wireless connection, or a combination thereof, on a single channel (e.g., as a single data stream or two or more multiplexed data streams) or on a plurality of different channels. The method 500 proceeds to step 514 where it ends.

Figure 6:
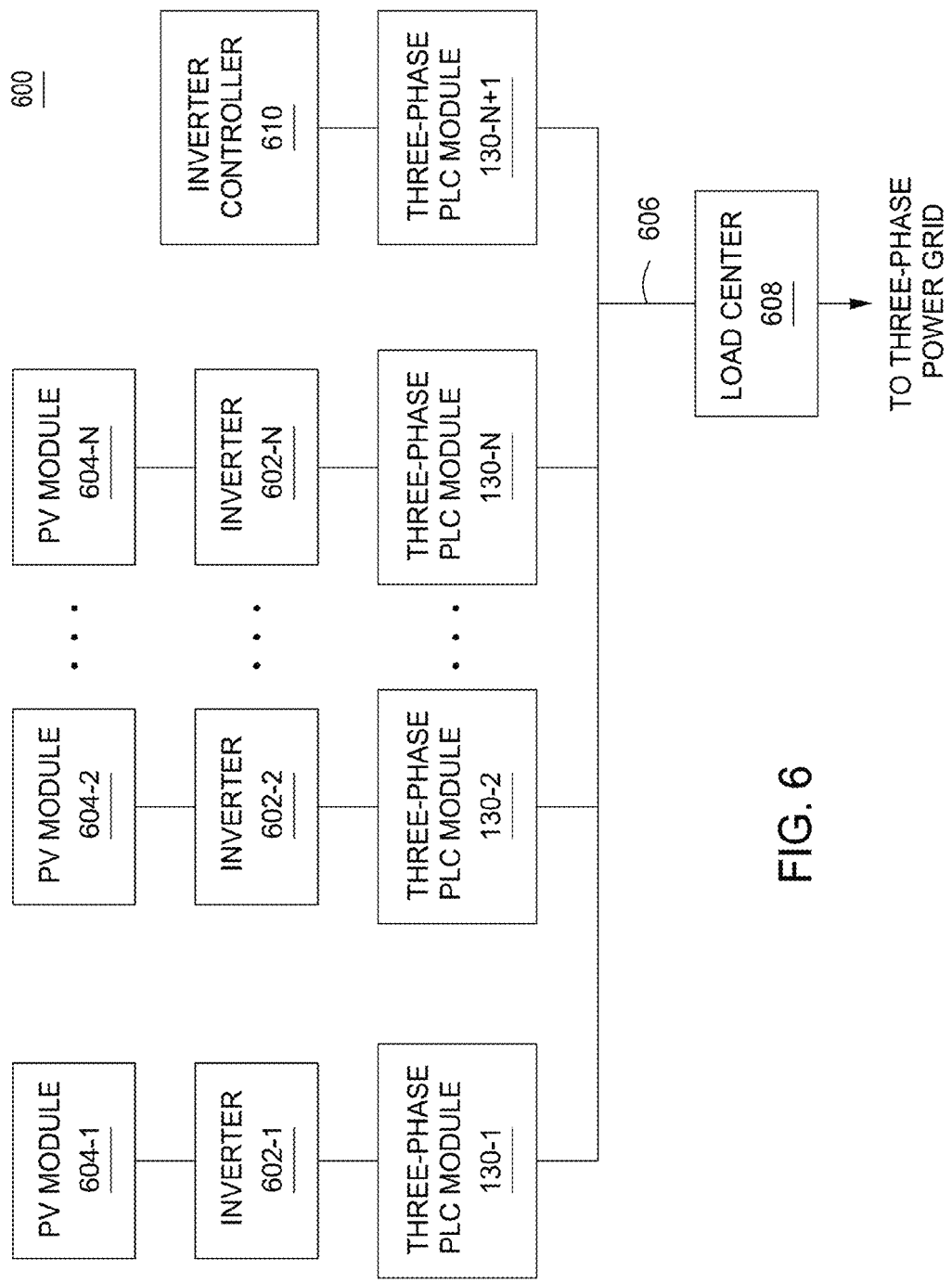
FIG. 6 is a block diagram of a system for inverting solar generated DC power to AC power using one or more embodiments of the present invention.

FIG. 6 is a block diagram of a system 600 for inverting solar generated DC power to AC power using one or more embodiments of the present invention. This diagram only portrays one variation of the myriad of possible system configurations and devices that may utilize the present invention. The present invention can be utilized by any device for power line communication (PLC), and can function in a variety of distributed environments and systems requiring communications over power lines.

The system 600 comprises a plurality of inverters 602-1, 602-2 . . . 602-N, collectively referred to as inverters 602; a plurality of photovoltaic (PV) modules 604-1, 604-2 . . . 604-N, collectively referred to as PV modules 604; a plurality of three-phase PLC modules 130-1, 130-2 . . . 130-N, and 130-N+1, collectively referred to as three-phase PLC modules 130; a three-phase AC power line 606; a load center 608; and an inverter controller 610.

Each inverter 602-1, 602-2 . . . 602-N is coupled to a three-phase PLC module 130-1, 130-2 . . . 130-N, respectively, in a one-to-one correspondence. In some alternative embodiments, each of the three-phase PLC modules 130-1, 130-2 . . . 130-N may be contained within the corresponding inverter 602-1, 602-2 . . . 602-N. Each inverter 602-1, 602-2 . . . 602-N is additionally coupled to a PV module 604-1, 604-2 . . . 604-N, respectively, in a one-to-one correspondence, although in some other embodiments the PV modules 604 may be coupled to a single inverter 602 (i.e., a single centralized inverter). The inverter controller 610 is coupled to the three-phase PLC module 130-N+1.

The three-phase PLC modules 130 are coupled to the AC power line 606 for communicating data via the AC power line 606. The AC power line 606 is further coupled to the load center 608 which houses connections between incoming commercial three-phase power lines from, for example, a commercial AC power grid distribution system and the AC power line 606. The inverters 602 convert DC power generated by the PV modules 604 into AC power and meter out AC current that is in-phase with the commercial AC power grid voltage. The system 600 couples the generated AC power to the commercial AC power grid via the load center 608; additionally or alternatively, the generated power may be distributed for use, for example to one or more appliances, and/or the generated energy may be stored for later use, for example using batteries, heated water, hydro pumping, $H_2O$-to-hydrogen conversion, or the like. In some other embodiments, the inverters 602 may be coupled to other suitable sources of DC power in addition to or in place of the PV modules 604, such as another type of renewable energy source (e.g., wind turbines, a hydroelectric system, or similar renewable energy source), a battery, an output from a previous power conversion stage, or the like. In still other embodiments, the inverters 602 may be AC-AC inverters that receive AC input from one or more suitable sources and convert the received AC power to another AC output.

The inverter controller 610 is capable of receiving data from the inverters 602, such as alarms, messages, operating data and the like, and transmitting data, such as command and control signals, to the inverters 602 for operably controlling the inverters 602. In accordance with one or more embodiments of the present invention, the three-phase PLC modules 130 enable such communication between the inverters 602 and the inverter controller 610 over the three-phase AC power lines 606. As described herein, each of the three-phase PLC modules 130 is enabled to generate, based on data received from the corresponding inverter 602 for transmission, a balanced three-phase PLC signal and to couple such signal to the phase lines of the AC power line 606 without a connection to a power line neutral or ground. Further, as described herein, each of the three-phase PLC modules 130 is enabled to receive the balanced three-phase PLC signal from the phase lines of the AC power line 606, to recover the originally transmitted data, and to communicate such recovered data to the corresponding inverter 602.

Also as described herein, any modulation scheme may be utilized to generate the balanced three-phase PLC signal, such as frequency-shift keying (FSK), phase shift keying (PSK), quadrature phase shift keying (QPSK), quadrature amplitude modulation (QAM), phase modulation (PM), frequency modulation (FM), amplitude modulation (AM), and the like. Such a balanced three-phase PLC signal eliminates the need to couple to a neutral or ground line, eliminates radiated emissions, and is resistant to external noise. Further, in some embodiments redundant signals may be transmitted, thereby providing one or more verification channels for recovering data lost or degraded during transmission.

In some other embodiments, the inverters 602 and/or the inverter controller 610 may communicate with other devices via the commercial power line using the PLC techniques disclosed herein.

Figure 7:
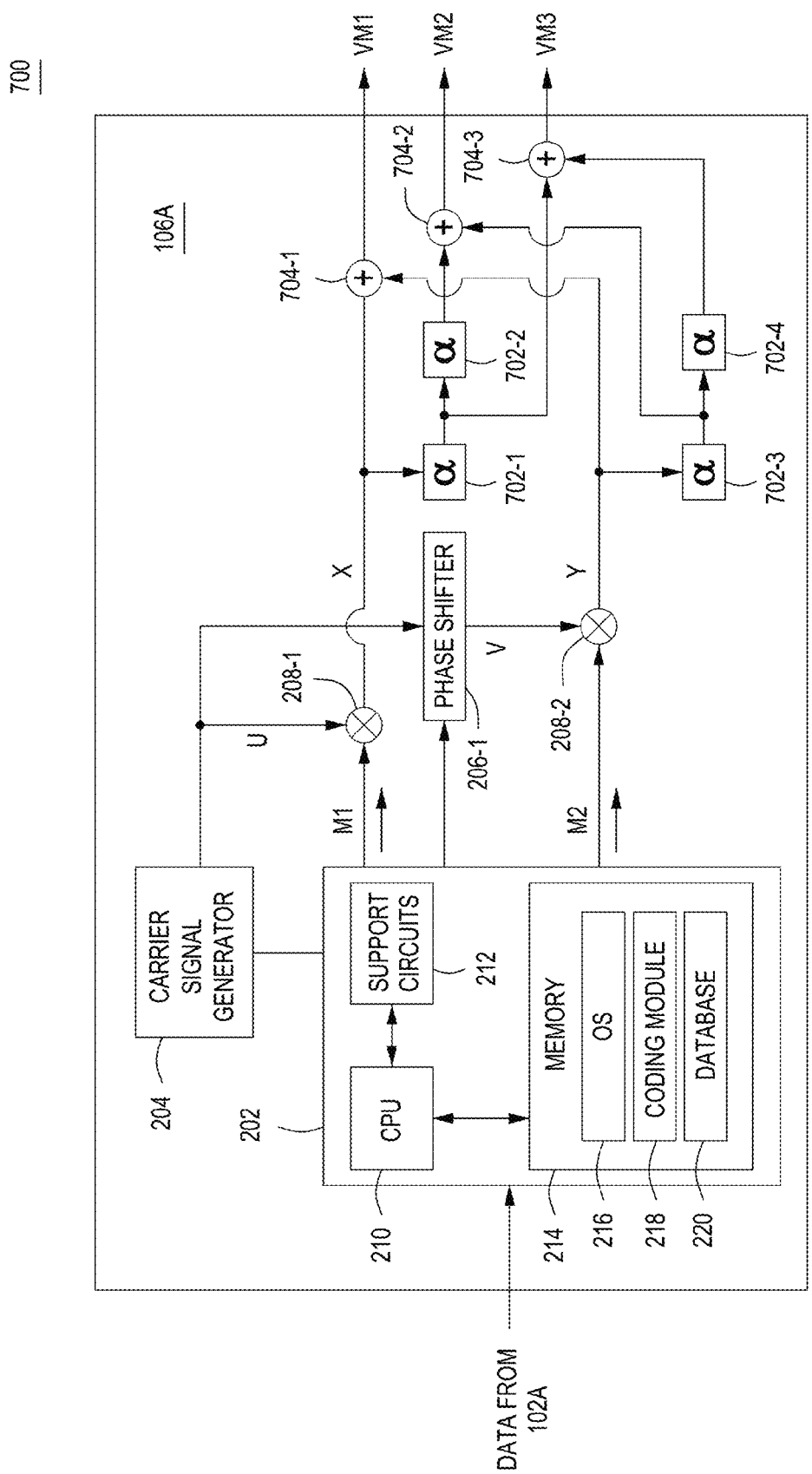
FIG. 7 is a block diagram of a three-phase modulator in accordance with one or more alternative embodiments of the present invention.

FIG. 7 is a block diagram of a three-phase modulator 106A in accordance with one or more alternative embodiments of the present invention. The three-phase modulator 106A depicted in FIG. 7 is one example of a modulator for generating the balanced PLC voltage signals VM1, VM2, and VM3 to communicate two independent data streams via the three-phase power line 120; in such embodiments, the three-phase modulator 106B may be analogous to the modulator 106A.

The three-phase modulator 106A comprises the coder 202, the carrier signal generator 204, the phase shifter 206-1 and the mixers 208-1 and 208-2 described above with respect to FIG. 2. The first carrier signal U, generated by the carrier signal generator 204, is coupled to the mixer 208-1 as well as to the phase shifter 206-1; the second carrier signal V, generated by the phase shifter 206-1, is coupled to the mixer 208-2. The modulation signals M1 and M2 from the coder 202 are coupled to mixers 208-1 and 208-2, respectively. As previously described, in some embodiments the mixers 208 may be complex mixers while in other embodiments the mixers 208 may be real multipliers.

In one or more other embodiments, the carrier signals U and/or V may be generated by a different means that produces the appropriate carrier signals; for example, the carrier signal generator 204 and the phase shifter 206-1 may be separate from the modulator 106A. In some embodiments, the coder 202 may be coupled to the carrier signal generator 204 and to phase shifter 206-1 for controlling the phases of the carrier signals U and V, for example, as determined by the coding module 218.

The three-phase modulator 106A further comprises phase shifters 702-1, 702-2, 702-3, and 702-4, as well as adders 704-1, 704-2, and 704-3. The output of the mixer 208-1 is coupled to the adder 704-1 and to the phase shifter 702-1. The output of the phase shifter 702-1 is coupled in to the input of the phase shifter 702-2 and to the adder 704-3; the output of the phase shifter 702-2 is coupled to the adder 704-2. The output of the mixer 208-2 is coupled to the phase shifter 702-3 and to the adder 704-1. The output of the phase shifter 702-3 is coupled to the adder 704-2 and to the phase shifter 702-4; the output of the phase shifter 702-4 is coupled to the adder 704-3. Each of the phase shifters 704 shifts the phase of the input signal by 120°.

The balanced voltage signals VM1, VM2, and VM3 to be generated by the three-phase modulator 106A may be represented as a linear combination of three vectors as shown below:

$$\begin{bmatrix} VM1 \\ VM2 \\ VM3 \end{bmatrix} = A * \begin{bmatrix} 0 \\ X \\ Y \end{bmatrix} \quad (1)$$

where X and Y are independent vectors based on the two independent data streams (i.e., one vector per each data stream) and A is a suitable non-singular matrix such that the following requirements are met:

$$VM1+VM2+VM3=0 \text{ for all } X \text{ and } Y; \text{ and} \quad (2)$$

$$\begin{bmatrix} 0 \\ X \\ Y \end{bmatrix} = A^{-1} * \begin{bmatrix} VM1 \\ VM2 \\ VM3 \end{bmatrix} \quad (3)$$

One such suitable matrix A is known as the Fortescue transformation matrix:

$$A = \begin{bmatrix} 1 & 1 & 1 \\ 1 & \alpha^2 & \alpha \\ 1 & \alpha & \alpha^2 \end{bmatrix} \quad (4)$$

where $\alpha=e^{2j\pi/3}$. Using the Fortescue transformation matrix, the balanced voltage signals VM1, VM2, and VM3 may be generated using X and Y as follows:

$$VM1=X+Y$$

$$VM2=\alpha^2 X+\alpha Y \quad (5)$$

$$VM3=\alpha X+\alpha^2 Y$$

In some embodiments, the signals (i.e., vectors) X and Y are generated by the three-phase modulator 106A using two independent data streams received from the device 102A. The data streams may be received, for example, on two separate input channels from the device 102A, or on a single channel from the device 102A as a multiplexed stream. Based on the received data, the coder 202 generates two independent modulation signals, M1 and M2, and couples such signals to the mixers 208-1 and 208-2, respectively. The resulting mixer outputs X and Y, respectively, are then phase-shifted and combined as described in equation set (5) to generate the balanced PLC voltage signals VM1, VM2, and VM3. VM1 is generated on a first output line by adding the signals X and Y at the adder 704-1. VM2 is generated on a second output line by phase-shifting X via the phase shifters 702-1 and 702-2 (i.e., phase shifting X by 240°), phase shifting Y via the phase shifter 702-3 (i.e., phase shifting Y by 120°), and adding the resulting signals at the adder 704-2. VM3 is generated on a third output line by phase-shifting X via the phase shifter 702-1 (i.e., phase shifting X by 120°), phase shifting Y via the phase shifters 702-3 and 702-4 (i.e., phase shifting Y by (240°), and adding the resulting signals at the adder 704-3. The three-phase modulator 106A thus generates a balanced three-phase PLC voltage signal for communicating two independent data streams via the three-phase power line 120.

In some other embodiments, modulator 106A may comprise fewer or more components than those depicted in FIG. 7 for generating the balanced voltage signals VM1, VM2, and VM3 based on two independent data streams. For example, the modulator 106A may receive vectors X and Y directly from the device 102A; in such embodiments, the modulator 106A may be comprised solely of phase shifters and adders for generating VM1, VM2, and VM3 as described above.

In some alternative embodiments, the modulator 106A may generate a three-phase balanced current signal as described above rather than a balanced voltage signal for PLC communication via the power line 120.

Figure 8:
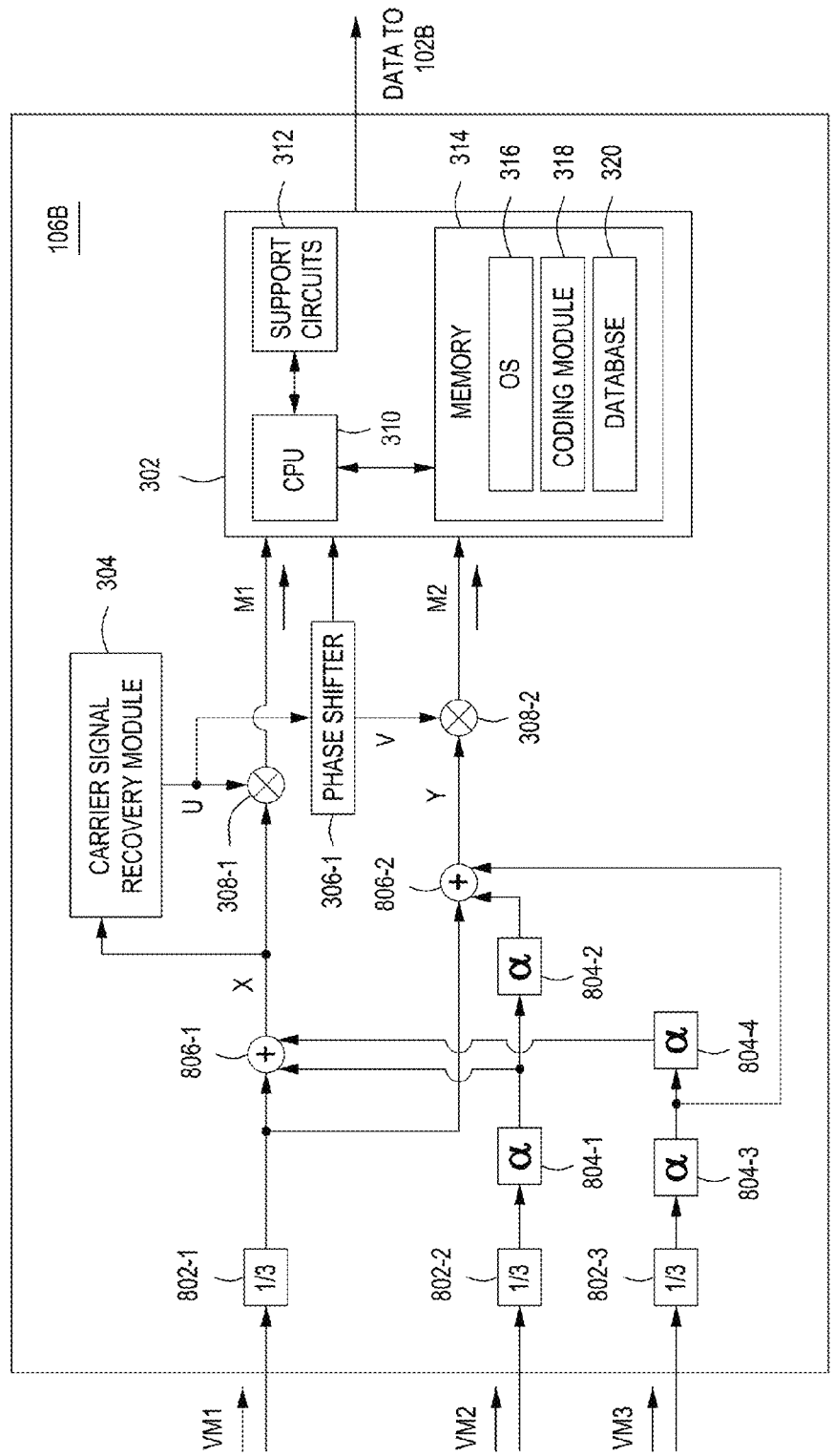
FIG. 8 is a block diagram of a three-phase demodulator in accordance with one or more alternative embodiments of the present invention.

FIG. 8 is a block diagram of a three-phase demodulator 108B in accordance with one or more alternative embodiments of the present invention. The three-phase demodulator 108A depicted in FIG. 8 is one example of a demodulator for demodulating voltage signals VM1, VM2, and VM3 generated as described above with respect to FIG. 7. The three-phase demodulator 108A may be analogous to the demodulator 108B.

As described above in Equation (3), the independent vectors X and Y may be represented as:

$$\begin{bmatrix} 0 \\ X \\ Y \end{bmatrix} = A^{-1} * \begin{bmatrix} VM1 \\ VM2 \\ VM3 \end{bmatrix} \tag{6}$$

For those embodiments where the matrix A is equal to the Fortescue transformation matrix, the independent vectors X and Y may be represented as:

$$\begin{bmatrix} 0 \\ X \\ Y \end{bmatrix} = \frac{1}{3} * \begin{bmatrix} 1 & 1 & 1 \\ 1 & \alpha & \alpha^2 \\ 1 & \alpha^2 & \alpha \end{bmatrix} * \begin{bmatrix} VM1 \\ VM2 \\ VM3 \end{bmatrix} \tag{7}$$

The vectors X and Y may thus be determined using VM1, VM2, and VM3 as follows:

$$X = \frac{1}{3}(VM1 + \alpha VM2 + \alpha^2 VM3) \tag{8}$$

$$Y = \frac{1}{3}(VM1 + \alpha^2 VM2 + \alpha VM3)$$

The three-phase demodulator 108B comprises the decoder 302, the carrier signal recovery module 304, the phase shifter 306-1 and the mixers 308-1 and 308-2 described above with respect to FIG. 3, as well as dividers 802-1, 802-2, and 802-3; phase shifters 804-1, 804-2, 804-3, and 804-4; and adders 806-1 and 806-2. Each of the dividers 802-1, 802-2, and 802-3 divides the corresponding input signal by one-third. The output of the divider 802-1 is coupled to the adders 806-1 and 806-2. The outputs of the dividers 802-2 and 802-3 are coupled to the phase shifters 804-1 and 804-3, respectively, and the outputs of the phase shifters 804-1 and 804-3 are then coupled to the phase shifters 804-2 and 804-4, respectively, as well as to the adders 806-1 and 806-2, respectively. The output of the phase shifter 804-2 is coupled to the adder 806-2, and the output of the phase shifter 804-4 is coupled to the adder 806-1.

The voltage signals VM1, VM2, and VM3 are coupled from the power lines L1, L2, and L3 to the dividers 802-1, 802-2, and 803-3, respectively, of the demodulator 108B. The signals VM1, VM2, and VM3 are each divided by one-third and then phase shifted and added as described in equation set (8) such that the vector X is generated at the output of the adder 806-1 and the vector Y is generated at the output of the adder 806-2.

The signal X from the adder 806-1 is coupled to the carrier signal recovery module 304 for recovering the first carrier signal U, and to the mixer 308-1. The first carrier signal U is then coupled to the mixer 308-1 as well as to the phase shifter 306-1. The phase shifter 306-1 shifts the phase of the first carrier signal U to generate the second carrier signal V, which is then coupled to the mixer 308-2 along with the signal Y from the adder 806-2. In one or more alternative embodiments, the carrier signals U and V may be recovered by a different means and coupled to the mixers 308-1 and 308-2, respectively. In some embodiments, the decoder 302 may be coupled to the phase shifter 306-1 for controlling the phase of the recovered carrier signal V, for example as determined by the decoding module 318.

The decoder 302 receives the recovered modulation signals M1 and M2, from the mixers 308-1 and 308-2, respectively. Decoding module 318 suitably decodes the received modulation signals M1 and M2 to recover the originally transmitted independent data streams, and couples such data to the device 102B. The two recovered independent data streams may be coupled to the device 102 B, for example, on two separate output channels to the device 102B, or on a single channel to the device 102B as a multiplexed stream. As previously described, in some embodiments the mixers 308 may be complex mixers while in other embodiments the mixers 308 may be "real" multipliers.

In some other embodiments, demodulator 108B may comprise fewer or more components than those depicted in FIG. 8 for recovering the two independent data streams from the balanced PLC voltage signals VM1, VM2, and VM3. For example, the demodulator 108B may be comprised solely of dividers, phase shifters, and adders for recovering the vectors X and Y as described above, and may then transmit such vectors directly to the device 102B.

In some alternative embodiments, the demodulator 108B may receive a three-phase balanced current signal via the power line 120 rather than a balanced voltage signal. In such embodiments, the demodulator 108B recovers the transmitted data from the three-phase balanced current signal as described above.

Figure 9:
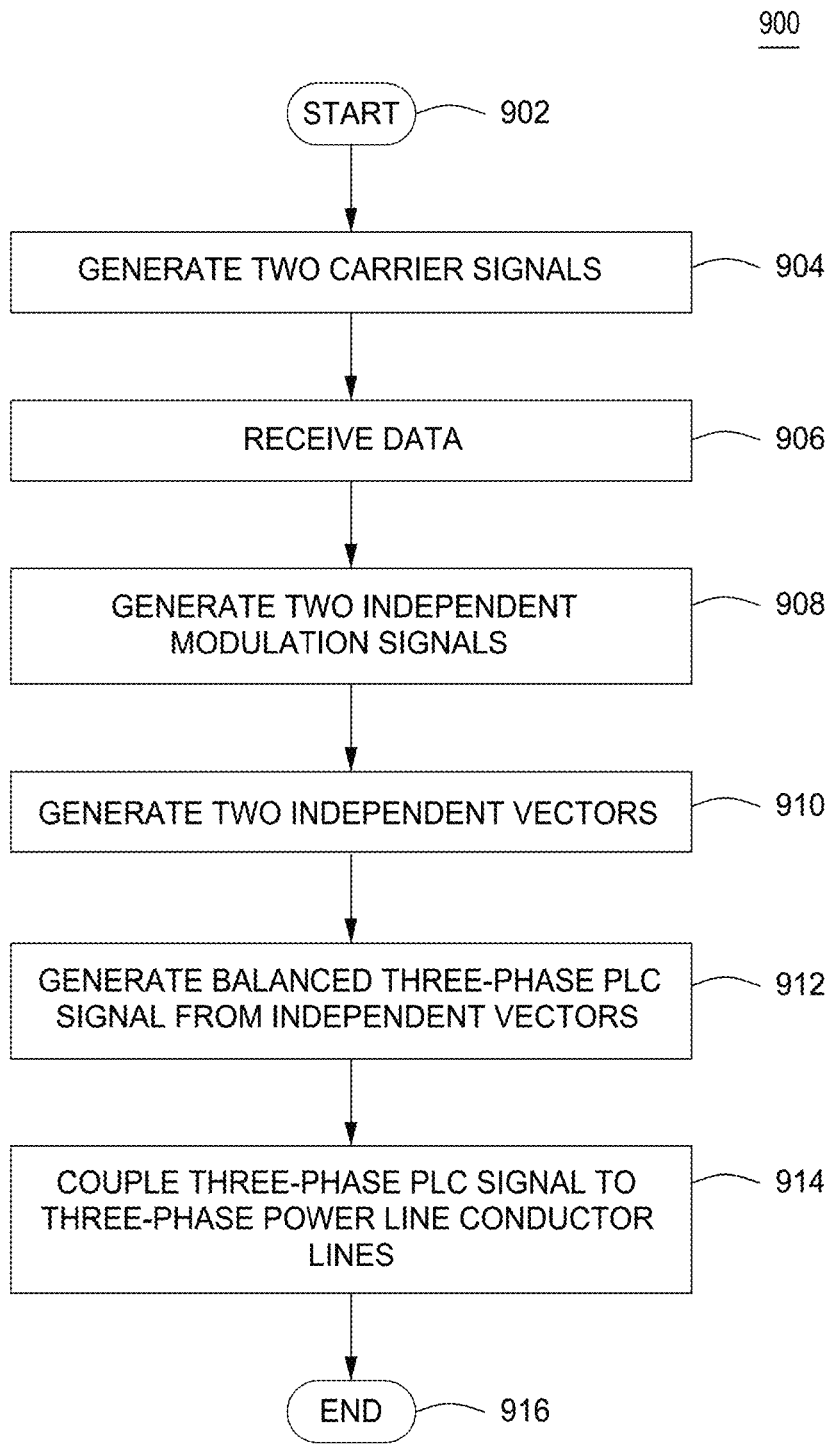
FIG. 9 is a flow diagram of a method for transmitting a balanced three-phase power line communication (PLC) signal over a three-phase power line in accordance with one or more embodiments of the present invention.

FIG. 9 is a flow diagram of a method 900 for transmitting a balanced three-phase power line communication (PLC) signal over a three-phase power line in accordance with one or more embodiments of the present invention. The method 900 starts at step 902 and proceeds to step 904. At step 904, two sinusoidal carrier signals, e.g., U and V, are generated at a frequency of 100 KHz; alternatively, a different carrier frequency and/or a different periodic waveform may be used. In some embodiments, the carriers U and V may be 120° phase shifted from one another; in other embodiments, the carriers U and V may have a different phase relationship to one another. In some alternative embodiments, one or both of the carrier signals may be provided from an external source rather than being generated as part of the method 900.

The method 900 proceeds to step 906 where two independent data streams are received for transmission via the three-phase power line. The data may be received from any suitable device that requires communications bandwidth for transmitting data, such as a home computer, peripheral device, and the like; in some embodiments, the device may be a power conversion module, such as a DC/AC inverter, or an AC/AC converter, or a controller that communicates with such a power conversion module. The data may be analog data or digital data and may be received via a wired connection, a wireless connection, or a combination thereof. The data may be received on a single channel, for example the two independent data streams may be multiplexed onto a single channel, or each of the independent data streams may be received on a different channel.

At step 908, two independent modulation signals, e.g., M1 and M2, are generated based on the received data. In some embodiments, for example in certain embodiments employing modulation such as FSK, PSK, or QAM, the carrier signals (U, V) and the modulation signals (M1, M2) are complex signals. The method 900 proceeds to step 910. At step 910, the carrier signals U and V are each modulated by one of the modulation signals M1 and M2 to generate two independent modulated signals, which may be represented by the vectors X and Y. Any type of modulation technique may be used to generate the two independent modulated signals, such as frequency-shift keying (PSK), phase shift keying (PSK), quadrature phase shift keying (QPSK), quadrature amplitude modulation (QAM), phase modulation (PM), frequency modulation (FM), amplitude modulation (AM), or the like. For example, QAM may be employed by generating U and V as quadrature carriers and amplitude modulating the carriers based on the two received independent data streams. In some alternative embodiments, the two independent modulated signals (i.e., the independent vectors X and Y) may be received from the device rather than the independent data streams and the method 900 begins upon receipt of the vectors X and Y.

At step 912, a balanced three-phase PLC signal (i.e., VM1, VM2, and VM3) is generated based on applying a suitable transformation to the vectors X and Y. In some embodiments, the balanced three-phase PLC signal may be generated based on a Fortescue transformation of the vectors X and Y, as described above with respect to FIG. 7.

The method 900 proceeds to step 914, where the generated three-phase PLC signal (i.e., VM1, VM2, and VM3) is coupled to the phase lines of the three-phase power line. Generally a three-phase power line coupler, such as three-phase power line coupler 110, couples the modulated voltage waveforms VM1, VM2, and VM3 to the phase lines, one modulated voltage waveform per phase line. For example, VM1 may be coupled to phase line L1, VM2 may be coupled to phase line L2, and VM3 may be coupled to phase line L3. In some alternative embodiments, the power line coupler comprises a Scott-T transformer for coupling two phases from the transceiver to the three-phase power line. Since the generated three-phase PLC signal coupled to the three-phase power line is balanced, no return path is needed and hence no connection to either a power line ground or neutral is needed. The method 900 then proceeds to step 916 where it ends.

In one or more alternative embodiments, three modulated current signals may be generated rather than modulated voltage signals; in such embodiments, the modulated current signals are balanced such that the vector sum of the three modulated current signals is equal to zero.

Figure 10:
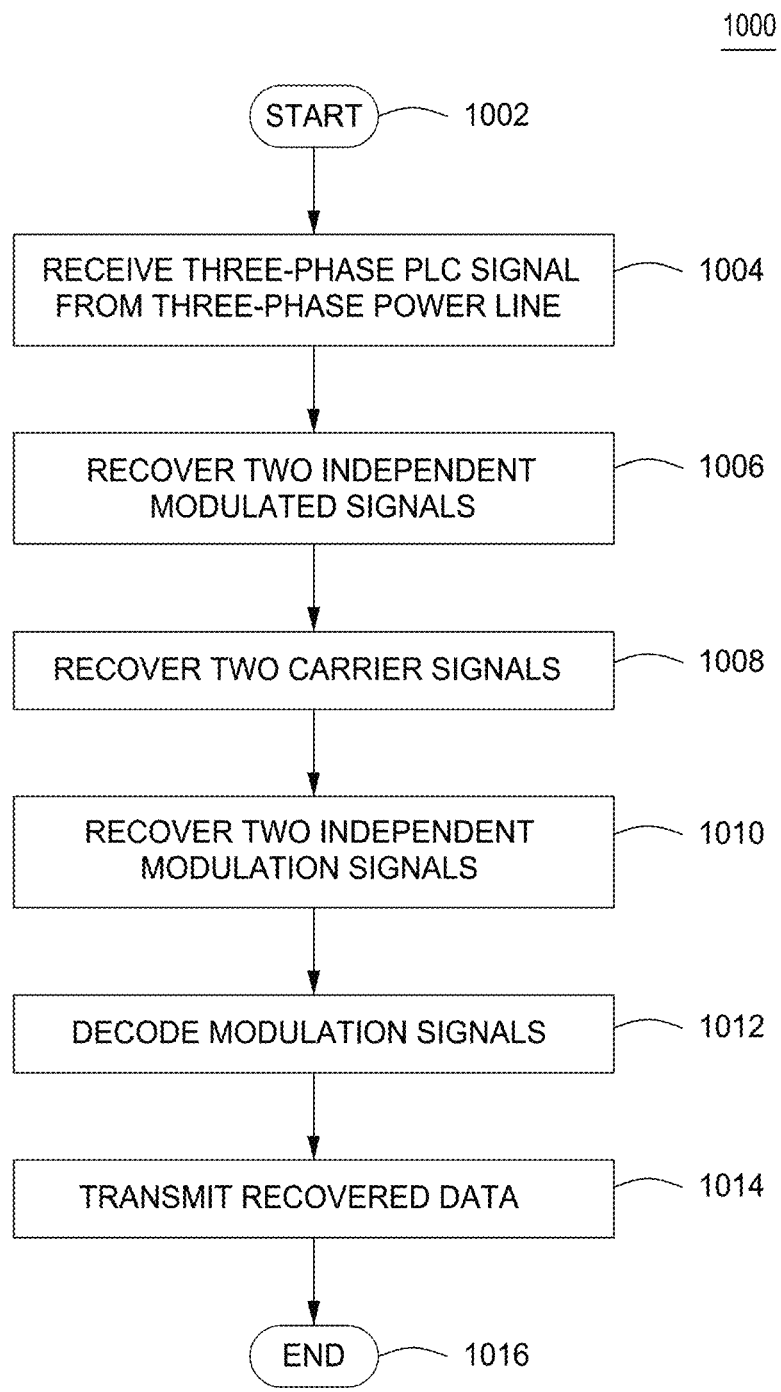
FIG. 10 is a flow diagram of a method for receiving and demodulating a balanced three-phase power line communication (PLC) signal transmitted over a three-phase power line in accordance with one or more embodiments of the present invention.

FIG. 10 is a flow diagram of a method 1000 for receiving and demodulating a balanced three-phase power line communication (PLC) signal transmitted over a three-phase power line in accordance with one or more embodiments of the present invention. In some embodiments, such as the embodiment described with respect to FIG. 10, the three-phase PLC signal is generated based on a suitable transformation (e.g., a Fortescue transformation) of two independent modulated signals as described above with respect to FIG. 9.

The method 1000 starts at step 1002 and proceeds to step 1004 where the three-phase PLC signal is received on the three-phase power line. The three-phase PLC signal consists of three modulated voltage signals VM1, VM2, and VM3, each modulated voltage signal carried on a different phase line of the three-phase power line. The modulated voltage signals VM1, VM2, and VM3 may be coupled from the power line to a demodulator by a three-phase power line coupler, such as three-phase power line coupler 110. In some alternative embodiments, the power line coupler comprises a Scott-T transformer for coupling three phases from the three-phase power line to the transceiver. In one or more alternative embodiments, the three-phase PLC signal consists of three modulated current signals rather than modulated voltage signals; in such embodiments, the modulated current signals are balanced such that the vector sum of the three modulated current signals is equal to zero.

At step 1006, the two independent modulated signals (i.e., X and Y) are recovered from the modulated voltage signals VM1, VM2, and VM3. The two independent modulated signals X and Y may be recovered based on applying a suitable transformation to modulated voltage signals VM1, VM2, and VM3, where such transformation is an inverse of the transformation used to generate VM1, VM2, and VM3. In some embodiments, the two independent modulated signals X and Y may be recovered based on an inverse of the Fortescue transformation applied to the modulated voltage signals VM1, VM2, and VM3, as described above with respect to FIG. 8.

At step 1008, two sinusoidal carrier signals, e.g., U and V, are recovered from one or more of the two independent modulated signals X and Y. The recovered carriers may be at a frequency of 100 KHz, although other frequencies may be used. In some embodiments, the carriers U and V may be 120° phase shifted from one another; in other embodiments, the carriers U and V may have a different phase relationship to one another. In some alternative embodiments, one or more of the carrier signals may be provided from an external source rather than being recovered as part of the method 1000.

At step 1010, the two independent modulation signals used to generate the two independent modulated signals X and Y are recovered. For example, the recovered carrier U may be mixed with the modulated signal X to generate a first recovered modulation signal M1, and the recovered carrier V may be mixed with the modulated signal Y to generate a second recovered modulation signal M2. In some embodiments, for example in certain embodiments employing modulation such as FSK, PSK, or QAM, the recovered carrier signals (U, V) and the recovered modulation signals (M1, M2) are complex signals.

The method 1000 proceeds to step 1012 where the recovered modulation signals M1 and M2 are decoded in accordance with the coding technique used to generate the original modulation signals (e.g., the coding technique used to generate the modulation signals as described with respect to FIG. 9). The recovered modulation signals M1 and M2 are thus decoded to recover the original two independent data streams described with respect to FIG. 9.

The method 1000 proceeds to step 1014 where the two recovered independent data streams are transmitted to a suitable device that requires communications bandwidth for receiving data, such as a home computer, peripheral device, and the like; in some embodiments, the device may be a power conversion module, such as a DC/AC inverter, or an AC/AC converter, or a controller that communicates with such a power conversion module. The two recovered independent data streams may be analog or digital and may be transmitted to the device, for example via a wired connection, a wireless connection, or a combination thereof. Further, the two recovered independent data streams may be transmitted to the device on a single channel (i.e., multiplexed onto the single channel) or on two different channels. The method 1000 proceeds to step 1016 where it ends.

Figure 11:
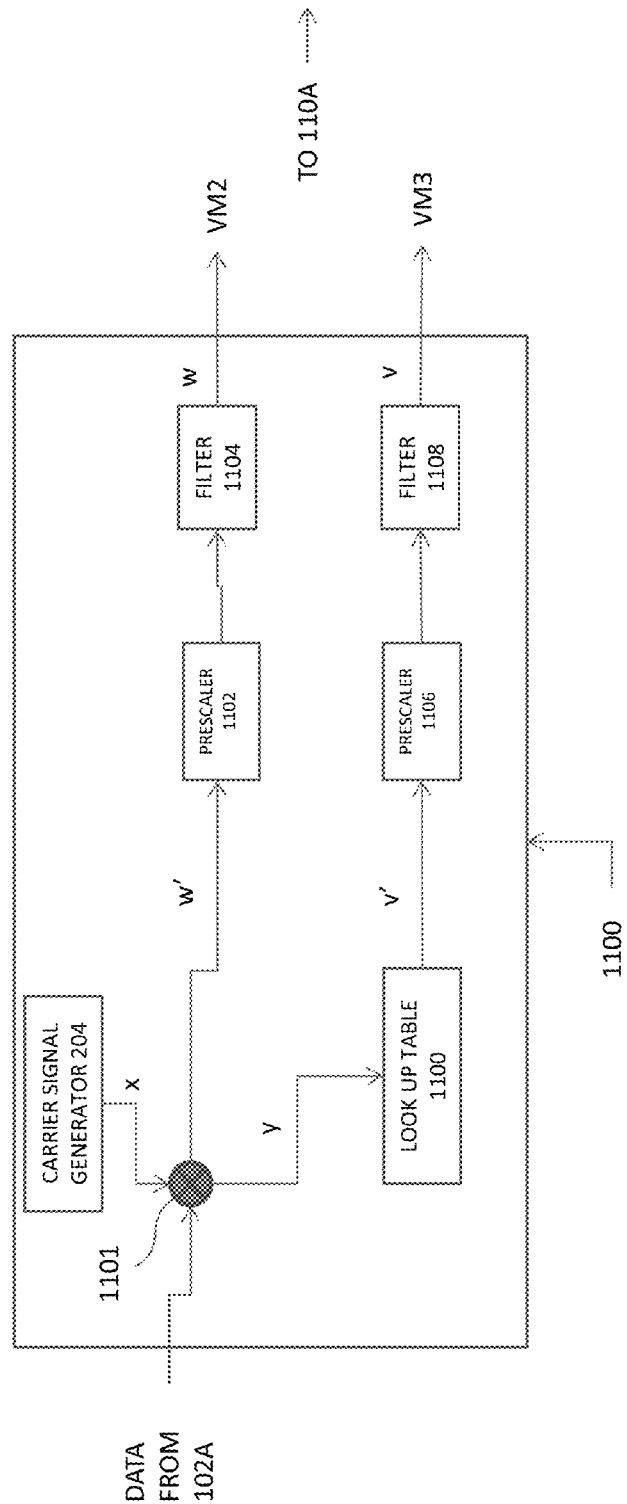
FIG. 11 is a block diagram of an alternate system for balanced three-phase power line communication (PLC) in accordance with one or more embodiments of the present invention.

FIG. 11 is a block diagram of an alternate signal modulator 1100 for balanced three-phase power line communication (PLC) in accordance with one or more embodiments of the present invention.

In exemplary embodiments, the modulator 1100 allows the transmission of dual-stream data over three-phase power lines without the use of a neutral line. The modulator 1100 significantly reduces the Peak-to-Average Power ratio (PAPR) as compared with prior methods of modulation, reduces the complexity required at the transmission side and reduces outband emission.

The modulator 1100 comprises a carrier signal generator 204, mixer 1101, a look up table 1100, a first multiplier 1102, a first filter 1104, a second multiplier 1106 and a second filter 1108. According to one embodiment where data only exists on one channel, the x signal is also transmitted on the second data stream, and the x signal is thereafter shifted to generate orthogonal data signals.

The carrier signal generator 204 generates a sinusoidal carrier signal "x" at a frequency, for example, of 100 KHz, although in other embodiments x may be generated at a different frequency. The carrier signal x is coupled to the mixer 1101 generating a modulation signal w' modulated by the single data stream from device 102A. In this embodiment, only one data stream is input to the system 1100, thus the modulated signal is modified using a lookup table 1100 instead of a coder (e.g., coder 202 in FIG. 2) to generate modulated signal v' orthogonal to signal w'. According to one embodiment, the lookup table 1100 is a sine or cosine lookup table. Generally the carrier signal x is a sinusoidal waveform, although in other embodiments other types of period waveforms may be used.

According to one embodiment, the signal on the y path is shifted 90 degrees in phase from the signal on the x path using the lookup table 1100. Prescaler 1102 and prescaler 1106 scale the w' signal and the v' signal, respectively. In some embodiments, the prescalers 1102 and 1106 are 1:5 prescalers. The scaled signal is then coupled to filter 1104 to produce the w signal and filter 1106 to produce the v signal, which are then coupled to the three-phase power line coupler 110A as VM2 and VM3, respectively. In some embodiments, the filters 1104 and 1106 are low pass filters used to reduce any low pass noise on the signals w' and v'.

The configuration described here and illustrated in FIG. 11 results in significantly lower PAPR on both phases B and C for two stream mode and lower outband emission. For one stream of data, the configuration shown in FIG. 11 produces balanced Phase A, Phase B and Phase C with simplified hardware as compared to the configuration illustrated in FIGS. 2 and 7.

For two streams of data, signals are available both on the X path and the Y path from device 102A while the signals are not necessarily equal. If the signal in the X path is a cosine signal, the signal in the Y path is modulated using a sine signal. If the signal in the X path is a sine signal, the signal in the Y path is modulated using a cosine signal. For example, according to one embodiment, the X path will transmit sin (x), and the Y path will transmit cos (y). Those of ordinary skill in the art will recognize that sin (x) and cosine (y) are orthogonal 50% of the time and during this period Phase A, Phase B and Phase C are balanced.

Figure 12:
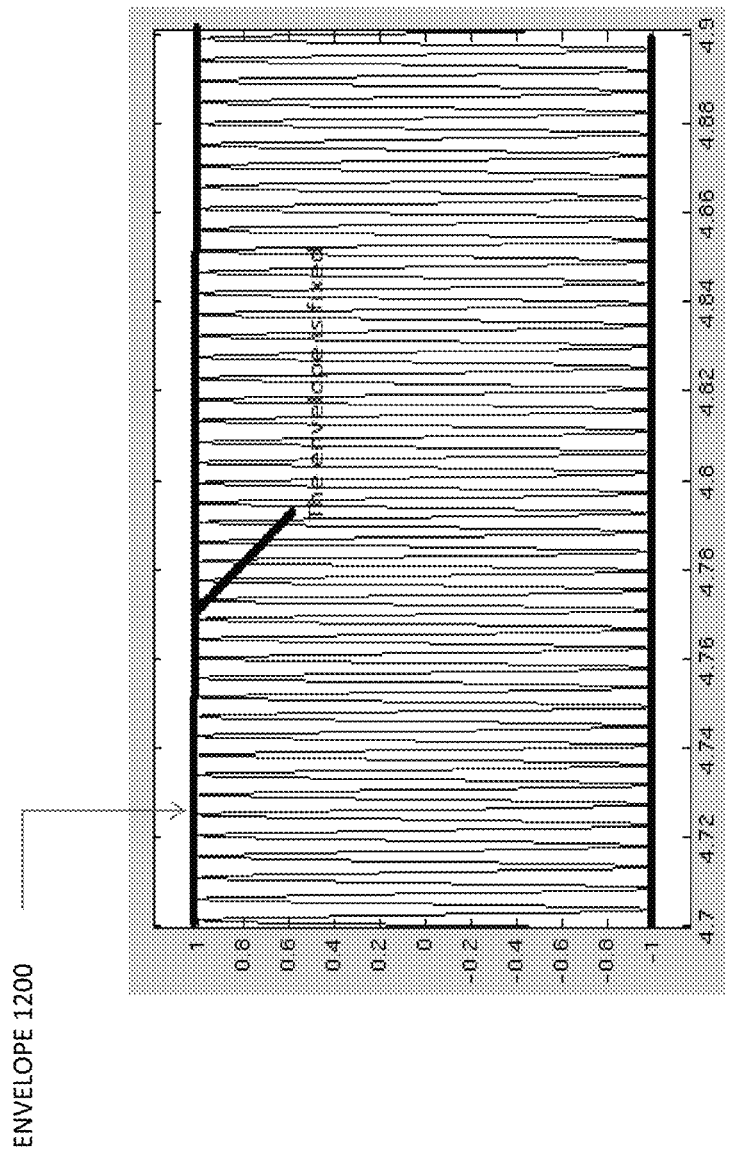
FIG. 12 illustrates an envelope for the balanced signal of the system depicted in FIG. 11 in accordance with exemplary embodiments of the present invention.

FIG. 12 illustrates an envelope 1200 for the balanced signals VM1 and VM2 of the modulator 1100 depicted in FIG. 11 in accordance with exemplary embodiments of the present invention. The envelope 1200 for the sin(x) signal remains constant, thus allowing the phases to be balanced at least 50% of the time, resulting in significantly reduced PAPR as compared to modulators utilizing a phase shifter (e.g., phase shifters 206) and a coder (e.g., coder 202).

The PAPR is calculated, after the transformer in the three-phase power line coupler 110A, according to the following formula:

$$PAPR = \frac{(\|A\|^2)_{max}}{E((\|A\|^2))}$$

Table 1 below shows PAPR values with the phase shifters 206 and coder 202 (FIG. 2 and FIG. 7) and without the phase shifter 206 (e.g., Hilbert module) and coder 202, according to the embodiment depicted in FIG. 11, in one stream mode.

TABLE 1

| PAPR values [dB] | | Phase 1 | Phase 2 | Phase3 |
|---|---|---|---|---|
| One stream case | With Shifter | 3.0065 | 3.2905 | 3.1694 |
| | Without Shifter | 3.0067 | 3.1461 | 3.0046 |

Table 2 below shows PAPR values with phase shifters 206 and coder 202 (FIG. 2 and FIG. 7) and without phase shifter 206 and coder 202, according to the embodiment depicted in FIG. 11, in two stream mode.

TABLE 2

| PAPR values [dB] | | Phase 1 | Phase 2 | Phase3 |
|---|---|---|---|---|
| Two streams case | With Phase Shifter | 6 (Theoretical) 6.1463 | 6 (Theoretical) 6.0359 | 6 (Theoretical) 6.0251 |
| | Without Phase Shifter | 3 3.0064 | 5.72 (Theoretical) 5.7148 | 5.72 (Theoretical) 5.7253 |

Ultimately, the result is that dual streams of information can be successfully transmitted over 3-phase power lines without the neutral line, with a low PAPR as compared to embodiments with coding and phase shifting depicted in FIGS. 2 and 7. The complexity of the system is further reduced since the phase shifters and coders are removed. Finally, lower out-band emission is achieved due to the low PAPR so that the emission control circuit can be simplified, increasing system performance. The simplified structure also results in a smaller chip area and lower fabrication and manufacture costs.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A method for generating a power line communication (PLC) signal, comprising:
generating a first modulation signal based on at least one data stream;
modulating a first carrier signal by the first modulation signal to generate a first signal;
generating a second signal by performing a phase shift via a lookup table based on the first signal; and
coupling a balanced three-phase PLC signal comprising the first signal, the second signal and a third signal to a three-phase power line.

2. The method of claim 1, further comprising:
generating a plurality of modulation signals, wherein the plurality of modulation signals comprises the first modulation signal, a second modulation signal and a third modulation signal;
modulating a plurality of carrier signals, wherein the plurality of carrier signals comprises the first carrier signal, a second carrier signal and a third carrier signal;
generating the second signal by modulating the second carrier signal by the second modulation signal; and
generating the third signal by modulating the third carrier signal by the third modulation signal.

3. The method of claim 2, wherein the at least one data stream comprises a first and a second data stream; the first modulation signal is based on the first data stream and the second modulation signal is based on the second data stream; and (vi) the third modulation signal is correlated to the first and the second modulation signals.

4. The method of claim 2, wherein the at least one data stream comprises a first, a second, and a third data stream; and the first, the second, and the third modulation signals are based on the first, the second, and the third data streams respectively.

5. The method of claim 1, wherein (i) the at least one data stream comprises a first and a second data stream; (ii) the first and a second modulation signal are generated based on the first and the second data streams, respectively; (iii) the first and a second carrier signal are modulated by the first and the second modulation signals, respectively, to generate first and second modulated signals; and (iv) the first, the second, and the third signals are generated based on a non-singular transformation matrix with respect to the first and the second modulated signals.

6. The method of claim 5, wherein the first signal=X+Y, the second signal=$\alpha^2 X+\alpha Y$, and the third signal=$\alpha X+\alpha^2 Y$; and wherein X=the first modulated signal, Y=the second modulated signal, and $\alpha=e^{2j\pi/3}$.

7. An apparatus for generating a power line communication (PLC) signal, comprising:
a three-phase modulator for (a) generating a first modulation signal based on at least one data stream, (b) modulating a first carrier signal by the first modulation signal to generate a first signal and (c) generating a second signal by performing a phase shift via a lookup table based on the first signal; and
a three-phase power line coupler for coupling a balanced three-phase PLC comprising the first signal, the second signal and a third signal to a three-phase power line.

8. The apparatus of claim 7, wherein (i) a plurality of modulation signals further comprises a third modulation signal; and (ii) a plurality of carrier signals further comprises a third carrier signal and the third signal is generated by modulating the third carrier signal by the third modulation signal.

9. The apparatus of claim 8, wherein the first, a second, and the third modulation signals are equal to one another, and wherein the first, a second, and the third carrier signals are equal in magnitude and phase-shifted from one another by 120°.

10. The apparatus of claim 8, wherein (iv) the at least one data stream comprises a first and a second data stream; (v) the first modulation signal is based on the first data stream and a second modulation signal is based on the second data stream; and (vi) the third modulation signal is correlated to the first and the second modulation signals.

11. The apparatus of claim 8, wherein (iv) the at least one data stream comprises a first, a second, and a third data stream; and (v) the first, a second, and the third modulation signals are based on the first, the second, and the third data streams respectively.

12. The apparatus of claim 7, wherein (i) the at least one data stream comprises a first and a second data stream; (ii) the first and a second modulation signal are generated based on the first and the second data streams, respectively; (iii) the first and a second carrier signal are modulated by the first and the second modulation signals, respectively, to generate first and second modulated signals; and (iv) the first, the second, and the third signals are generated based on a non-singular transformation matrix with respect to the first and the second modulated signals.

13. The apparatus of claim 12, wherein the first signal=X+Y, the second signal=$\alpha^2 X+\alpha Y$, and the third signal=$\alpha X+\alpha^2 Y$; and wherein X=the first modulated signal, Y=the second modulated signal, and $\alpha=e^{2j\pi/3}$.

14. A system for power line communication (PLC), comprising:
a three-phase modulator for (a) generating a first modulation signal based on at least one data stream, (b) modulating a first carrier signal by the first modulation signal to generate a first signal and (c) generating a second signal by performing a phase shift via a lookup table based on the first signal;
a first three-phase power line coupler for coupling a balanced three-phase PLC signal comprising the first signal, the second signal and a third signal from the three-phase modulator to a three-phase power line;
a second three-phase power line coupler for coupling the balanced three-phase PLC signal from the three-phase power line to a three-phase demodulator; and
the three-phase demodulator for (c) recovering a plurality of recovered modulation signals from the first, the second, and the third signals, and (d) decoding the plurality of recovered modulation signals to recover the at least one data stream.

15. The system of claim 14, wherein the three-phase modulator generates a plurality of modulation signals comprising the first, a second, and a third modulation signal; (ii) wherein a plurality of carrier signals comprises the first, a second, and a third carrier signal; and (iii) the first signal is generated by modulating the first carrier signal by the first modulation signal, the second signal is generated by modulating the second carrier signal by the second modulation signal, and the third signal is generated by modulating the third carrier signal by the third modulation signal.

16. The system of claim 15, wherein the first, the second, and the third modulation signals are equal to one another, and wherein the first, the second, and the third carrier signals are equal.

17. The system of claim 15, wherein (iv) the at least one data stream comprises a first and a second data stream; (v) the first modulation signal is based on the first data stream and the second modulation signal is based on the second data stream; and (vi) the third modulation signal is correlated to the first and the second modulation signals.

18. The system of claim 15, wherein (iv) the at least one data stream comprises a first, a second, and a third data stream; and (v) the first, the second, and the third modulation signals are based on the first, the second, and the third data streams respectively.

19. The system of claim 14, wherein (i) the at least one data stream comprises a first and a second data stream; (ii) a plurality of modulation signals comprises the first and a second modulation signal generated based on the first and the second data streams, respectively; (iii) the first and a second carrier signal are modulated by the first and the second modulation signals, respectively, to generate first and second modulated signals; (iv) the first, the second, and the third signals are generated based on a non-singular transformation matrix with respect to the first and the second modulated signals; and (v) the first signal=X+Y, the second signal=$\alpha^2$X+$\alpha$Y, and the third signal=$\alpha$X+$\alpha^2$Y; wherein X=the first modulated signal, Y=the second modulated signal, and $\alpha=e^{2j\pi/3}$.

* * * * *